US011994737B2

(12) United States Patent
Kim

(10) Patent No.: US 11,994,737 B2
(45) Date of Patent: May 28, 2024

(54) CAMERA MODULE AND ELECTRONIC DEVICE INCLUDING THE SAME

(71) Applicant: Samsung Electronics Co., Ltd., Gyeonggi-do (KR)

(72) Inventor: Seungyong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 163 days.

(21) Appl. No.: 17/681,042

(22) Filed: Feb. 25, 2022

(65) Prior Publication Data

US 2022/0276459 A1  Sep. 1, 2022

Related U.S. Application Data

(63) Continuation of application No. PCT/KR2022/001969, filed on Feb. 9, 2022.

(30) Foreign Application Priority Data

Feb. 26, 2021 (KR) .................. 10-2021-0026608

(51) Int. Cl.
*G02B 7/02* (2021.01)
*G03B 17/12* (2021.01)
(Continued)

(52) U.S. Cl.
CPC ............. *G02B 7/021* (2013.01); *G03B 17/12* (2013.01); *H04N 23/54* (2023.01); *H04N 23/55* (2023.01)

(58) Field of Classification Search
CPC ........ G02B 7/021; G02B 7/02; G02B 27/646; G02B 27/0018; G03B 17/12; G03B 30/00;
(Continued)

(56) References Cited

U.S. PATENT DOCUMENTS 7,787,184 B2   8/2010   Yoshikawa et al.
9,864,160 B2   1/2018   Lin et al.
(Continued)

FOREIGN PATENT DOCUMENTS

KR   10-1414826   7/2014
KR   10-1436529   9/2014
(Continued)

OTHER PUBLICATIONS

KR 10-2019-0111482 Translation (Year: 2019).*
(Continued)

*Primary Examiner* — Twyler L Haskins
*Assistant Examiner* — Angel L Garces-Rivera
(74) *Attorney, Agent, or Firm* — The Farrell Law Firm, P.C.

(57) ABSTRACT

An electronic device is provided that includes a camera module that receives external light through a portion of a surface of the electronic device. The camera module includes a camera housing having an image sensor disposed on a bottom surface of the camera housing. The camera module also includes and a lens assembly. At least a portion of the lens assembly is disposed in the camera housing. The lens assembly includes a first lens, a second lens, and a spacer disposed between the first lens and the second lens. The spacer has an opening area formed therein. An optical axis passes through the opening area. The spacer is formed such that a first inner surface of the opening area and a second inner surface of the opening area are parallel to each other in a cross-sectional view that includes the optical axis.

20 Claims, 22 Drawing Sheets

(51) Int. Cl.
*H04N 23/54* (2023.01)
*H04N 23/55* (2023.01)

(58) Field of Classification Search
CPC ........ H04N 23/54; H04N 23/55; H04N 23/00; H04N 23/57
See application file for complete search history.

(56) References Cited

U.S. PATENT DOCUMENTS

| | | | |
|---|---|---|---|
| 9,946,047 | B2 | 4/2018 | Lin et al. |
| 10,197,761 | B2 | 2/2019 | Lin et al. |
| 10,222,516 | B2 | 3/2019 | Chou et al. |
| 10,488,564 | B2 | 11/2019 | Chou et al. |
| 11,333,845 | B2 | 5/2022 | Yedid et al. |
| 2006/0227834 | A1 | 10/2006 | Yoshikawa et al. |
| 2015/0253532 | A1 | 9/2015 | Lin |
| 2016/0377827 | A1 | 12/2016 | Kang et al. |
| 2017/0108627 | A1 | 4/2017 | Chou et al. |
| 2018/0081144 | A1 | 3/2018 | Lin et al. |
| 2019/0137666 | A1 | 5/2019 | Chou et al. |
| 2020/0409020 | A1 | 12/2020 | Yedid et al. |
| 2022/0214515 | A1 | 7/2022 | Choi et al. |
| 2022/0229262 | A1 | 7/2022 | Yedid et al. |
| 2022/0350115 | A1 | 11/2022 | Yoo et al. |

FOREIGN PATENT DOCUMENTS

| | | |
|---|---|---|
| KR | 1020170000252 | 1/2017 |
| KR | 1020190070230 | 6/2019 |
| KR | 1020190111482 | 10/2019 |
| KR | 1020200031512 | 3/2020 |
| KR | 1020200076175 | 6/2020 |
| KR | 1020200101409 | 8/2020 |
| KR | 1020210072981 | 6/2021 |
| KR | 1020220029924 | 3/2022 |
| KR | 1020220099220 | 7/2022 |

OTHER PUBLICATIONS

KR 10-1414826 Translation (Year: 2014).*
International Search Report dated May 26, 2022 issued in counterpart application No. PCT/KR2022/001969, 9 pages.

* cited by examiner (701)

(702)

CAMERA MODULE AND ELECTRONIC DEVICE INCLUDING THE SAME

PRIORITY

This application is a continuation of International Application No. PCT/KR2022/001969 designating the United States, filed in the Korean IP Receiving Office on Feb. 9, 2022, and based on and claims priority under 35 U.S.C. § 119(a) to Korean Application No. 10-2021-0026608, filed in the Korean IP Office on Feb. 26, 2021, the content of which is incorporated herein by reference.

BACKGROUND

1. Field

The disclosure relates generally to a camera module of an electronic device, and more particularly, to a camera module of an electronic device having decreased internal reflection.

2. Description of Related Art

A mobile electronic device, such as, for example, a smartphone, may include a camera module. The camera module may include lenses, a lens barrel surrounding the lenses, and an image sensor. The camera module may receive light reflected from an external object. The light reflected from the object may travel into the lens barrel, may pass through the lenses, and may travel to the image sensor. The image sensor may convert the received light signal into a related electrical signal.

The camera module may further include a spacer located in the lens barrel and disposed between the lenses. A portion of the light that is reflected from the object and that travels into the lens barrel may be reflected by the spacer. The light that is internally reflected by the spacer may degrade the quality of a generated image. For example, the internally reflected light may cause a flare phenomenon, a ghost phenomenon, or a light blurring phenomenon.

SUMMARY

Embodiments of the disclosure provide a camera module including a spacer that decreases internal reflection within a lens barrel, and an electronic device including the camera module.

According to an aspect, an electronic device is provided that includes a camera module that receives external light through a portion of a surface of the electronic device. The camera module includes a camera housing having an image sensor disposed on a bottom surface of the camera housing. The camera module also includes and a lens assembly. At least a portion of the lens assembly is disposed in the camera housing. The lens assembly includes a first lens, a second lens, and a spacer disposed between the first lens and the second lens. The spacer has an opening area formed therein. An optical axis passes through the opening area. The spacer is formed such that a first inner surface of the opening area and a second inner surface of the opening area are parallel to each other in a cross-sectional view that includes the optical axis.

According to the embodiments of the disclosure, internal reflection caused by the spacer may be decreased. Accordingly, a defect in a generated image may be decreased, and the quality of the image may be improved. Furthermore, the spacer may be manufactured through a process simplified when compared to the related art. Accordingly, product reliability may be improved, and manufacturing costs may be decreased.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
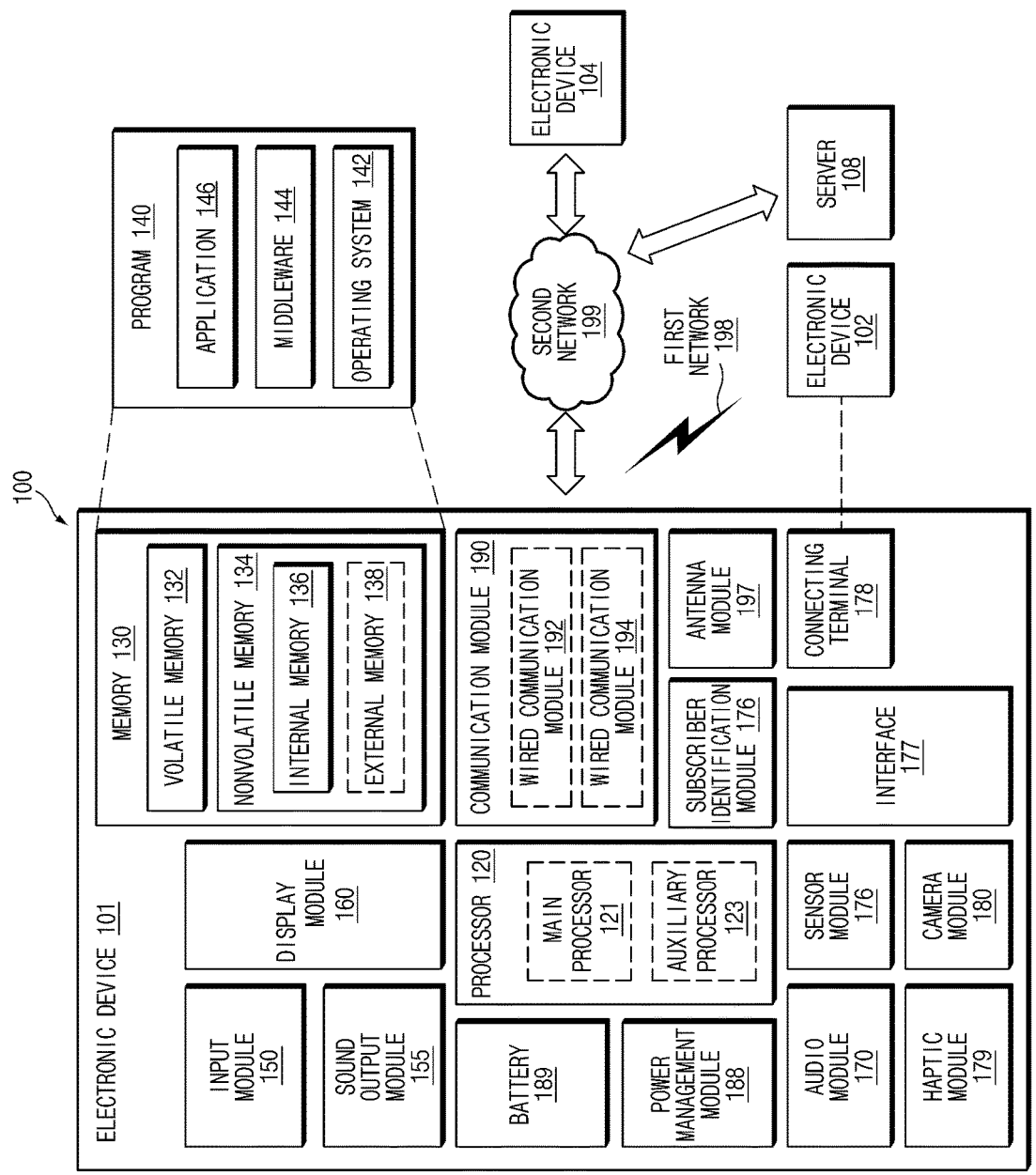
FIG. 1 is a block diagram illustrating an electronic device in a network environment, according to an embodiment.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure. The embodiments and the terms used therein are not intended to limit the technology disclosed herein to specific forms, and should be understood to include various modifications, equivalents, and/or alternatives to the corresponding embodiments. A singular expression may include a plural expression unless they are definitely different in a context.

FIG. 1 is a block diagram illustrating an electronic device in a network environment, according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel.

The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
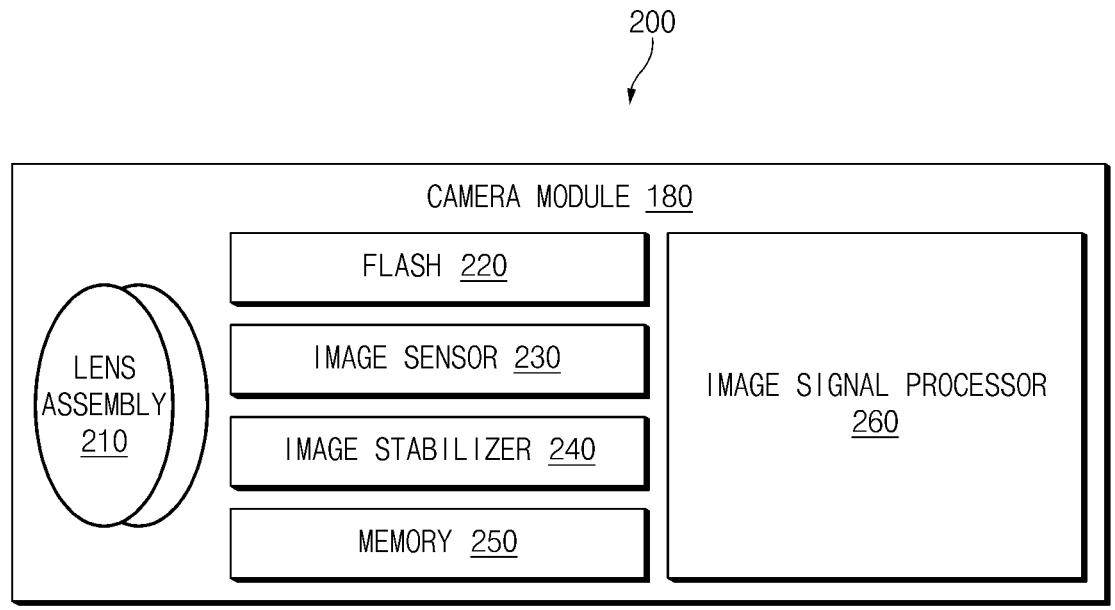
FIG. 2 is a block diagram illustrating a camera module, according to an embodiment.

FIG. 2 is a block diagram illustrating the camera module, according to an embodiment.

Referring to FIG. 2, the camera module 180 (e.g., a camera module 400 of FIGS. 3A to 3C or a camera module 400 of FIG. 4) of diagram 200 may include a lens assembly 210 (e.g., a lens assembly 430 of FIG. 6), a flash 220, an image sensor 230 (e.g., an image sensor 432 of FIG. 5), an image stabilizer 240, memory 250 (e.g., buffer memory), or an image signal processor 260. In an embodiment, at least one of components (e.g., the lens assembly 210, the flash 220, the image sensor 230, the image stabilizer 240, and the memory 250) included in the camera module 180 may operate under the control of control circuitry (e.g., the processor 120 of FIG. 1) of an electronic device (e.g., the electronic device 101 of FIG. 1). For example, the control circuitry (e.g., the processor 120 of FIG. 1) may include a main processor (e.g., the main processor 121 of FIG. 1) and/or an auxiliary processor (e.g., the auxiliary processor 123 of FIG. 1 or the image signal processor 260).

In an embodiment, the lens assembly 210 may collect light emitted from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

In an embodiment, the flash 220 may emit light that is used to reinforce light emitted or reflected from an object. According to an embodiment, the flash 220 may include one or more light emitting diodes (e.g., a red-green-blue (RGB) light-emitting diode (LED), a white LED, an infrared LED, or an ultraviolet LED) or a xenon lamp.

In an embodiment, the image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black and white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

In an embodiment, the image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

In an embodiment, the memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

In an embodiment, the image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180.

According to an embodiment, the image signal processor 260 may be configured as at least part (e.g., the auxiliary processor 123 of FIG. 1) of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device (e.g., the electronic device 101 of FIG. 1) may include a plurality of camera modules 180 having different attributes or functions. For example, a plurality of camera modules 180 including lenses (e.g., the lens assembly 210) having different view angles may be provided, and based on user selection, the electronic device 101 may perform control to use the wide angle of the camera module 180 related to the user selection. For example, at least one of the plurality of camera modules 180 may be a wide-angle camera and at least another one of the plurality of camera modules 180 may be a telephoto camera. Similarly, at least one of the plurality of camera modules 180 may be a front camera and at least another one of the plurality of camera modules 180 may be a rear camera. Furthermore, the plurality of camera modules 180 may include at least one of a wide-angle camera, a telephoto camera, a color camera, a black and white camera, or an infrared (IR) camera (e.g., a time of flight (TOF) camera or a structured light camera). According to an embodiment, the IR camera may operate as at least part of a sensor module (e.g., the sensor module 176 of FIG. 1). For example, the TOF camera (e.g., a camera module 312 of FIG. 3B) may operate as at least part of a sensor module (e.g., the sensor module 176 of FIG. 1) for sensing the distance to an object.

Figure 3A:
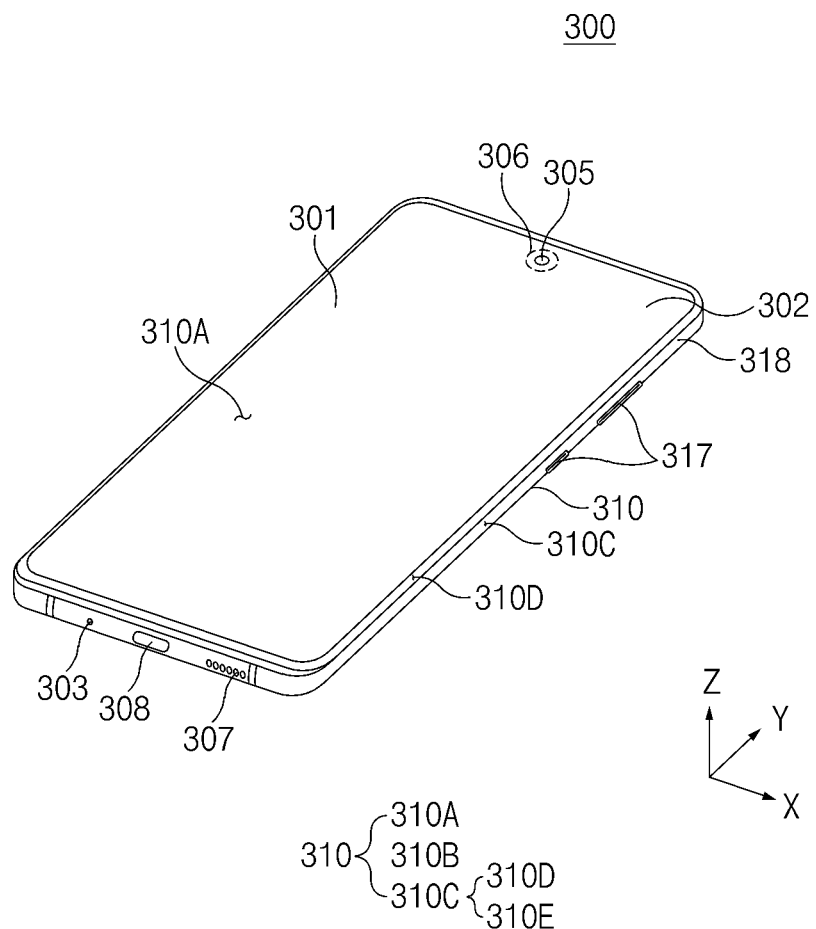
FIG. 3A is a diagram illustrating front perspective view of an electronic device, according to an embodiment.
Figure 3B:
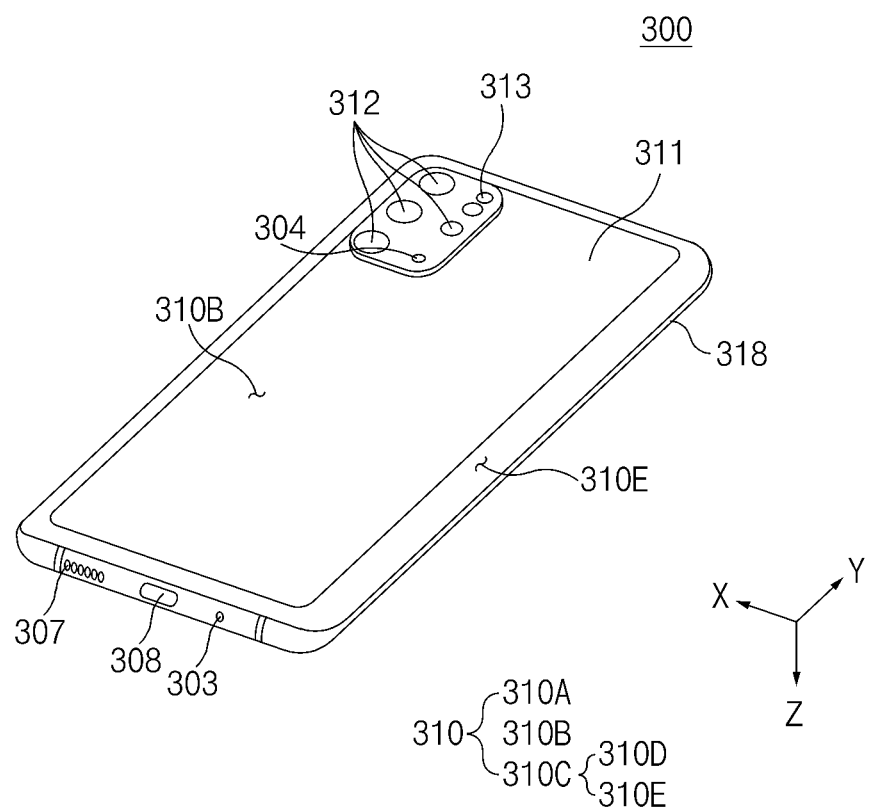
FIG. 3B is a diagram illustrating rear perspective view of the electronic device, according to an embodiment.
Figure 3C:
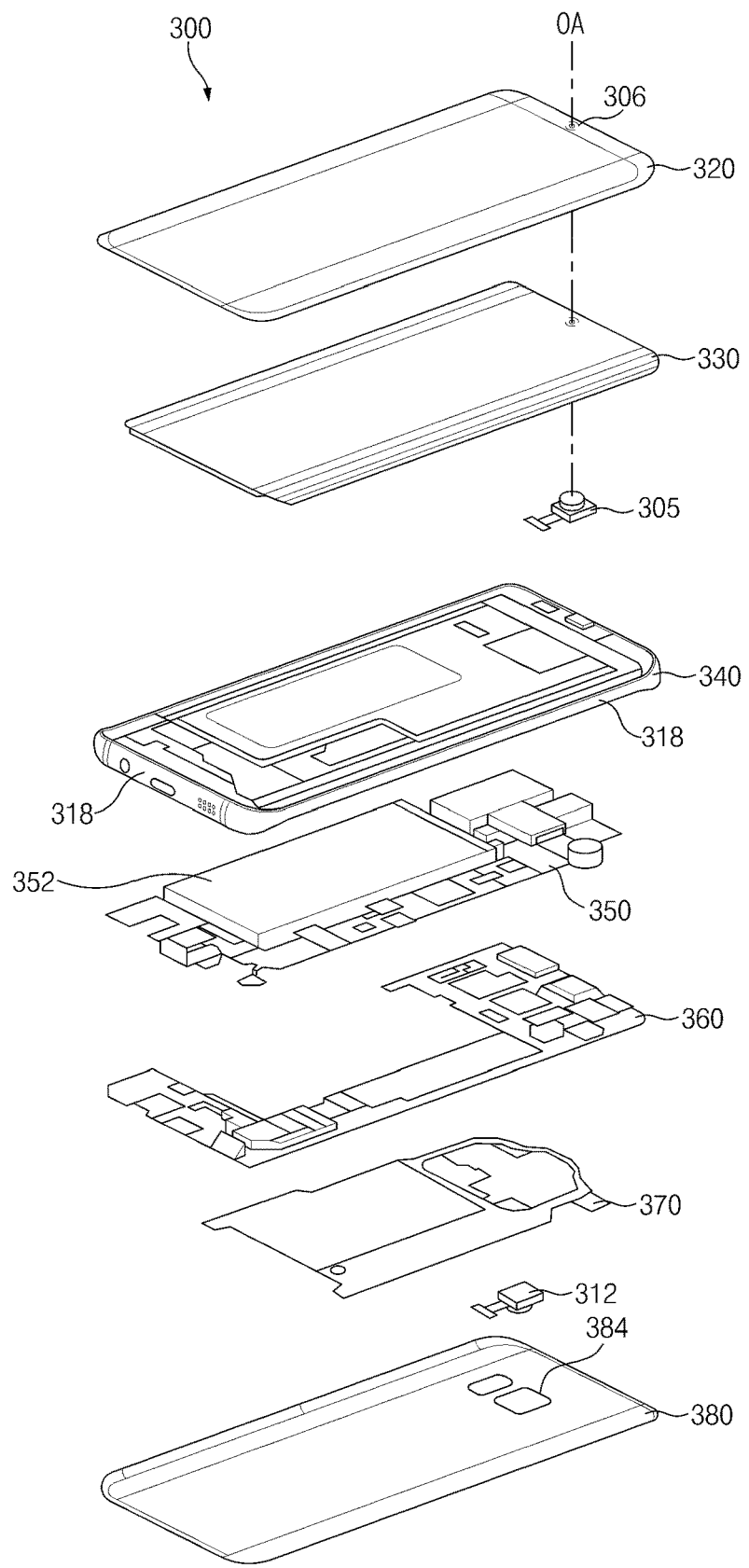
FIG. 3C is a diagram illustrating an exploded perspective view of the electronic device, according to an embodiment.

FIG. 3A is a diagram illustrating a front perspective view of an electronic device, according to an embodiment. FIG. 3B is a diagram illustrating a rear perspective view of the electronic device, according to an embodiment. FIG. 3C is a diagram illustrating an exploded perspective view of the electronic device, according to an embodiment.

Referring to FIGS. 3A and 3B, an electronic device 300 includes a housing 310 having a first surface (or a front surface) 310A, a second surface (or a rear surface) 310B, and a side surface 310C surrounding a space between the first surface 310A and the second surface 310B.

The housing 310 may refer to a structure that forms some of the first surface 310A, the second surface 310B, and the side surface 310C.

The first surface 310A is formed by a front plate 302 (e.g., a front plate 320 of FIG. 3C), at least a portion of which is substantially transparent. The front plate 302 may include a glass plate including various coating layers or a polymer plate. The second surface 310B is formed by a back plate 311 (e.g., a back plate 380 of FIG. 3C) that is substantially opaque. The back plate 311 may be formed of, for example, coated or colored glass, ceramic, polymer, metal (e.g., aluminum, stainless steel (STS), or magnesium), or a combination of at least two of the aforementioned materials. The side surface 310C is formed by a side bezel structure 318 that is coupled with the front plate 302 and the back plate 311 and that contains metal and/or polymer.

The back plate 311 and the side bezel structure 318 may be integrally formed with each other and may contain the same material (e.g., a metallic material such as aluminum).

The front plate 302 includes two first areas 310D that curvedly and seamlessly extend from partial areas of the first surface 310A toward the back plate 311. The first areas 310D may be located at opposite long edges of the front plate 302.

The back plate 311 includes two second areas 310E that curvedly and seamlessly extend from partial areas of the second surface 310B toward the front plate 302. The second areas 310E may be located at opposite long edges of the back plate 311.

The front plate 302 (or, the back plate 311) may include only one of the first areas 310D (or the second areas 310E). Furthermore, the front plate 302 (or the back plate 311) may not include a part of the first areas 310D (or the second areas 310E).

When viewed from a side of the electronic device 300, the side bezel structure 318 may have a first thickness (or width) at sides (e.g., short sides) not including the first areas 310D or the second areas 310E, and may have a second thickness at sides (e.g., long sides) including the first areas 310D or the second areas 310E, where the second thickness is smaller than the first thickness.

The electronic device 300 includes at least one of a display 301, audio modules 303, 304, and 307, a sensor module, camera modules 305 and 312, key input devices 317, a light emitting element, and a connector hole 308. At least one component (e.g., the key input devices 317 or the light emitting element) among the aforementioned components may be omitted from the electronic device 300, or other component(s) may be additionally included in the electronic device 300.

The display 301 may be exposed through at least a portion of the front plate 302. For example, at least a portion of the display 301 may be exposed through the front plate 302 that includes the first surface 310A and the first areas 310D of the side surface 310C.

The shape of the display 301 may be formed to be substantially the same as the shape of the adjacent outside edge of the front plate 302. The gap between the periphery of the display 301 and the periphery of the front plate 302 may be substantially constant to expand the area by which the display 301 is exposed.

A surface of the housing 310 (or the front plate 302) may include a display area through which the display 301 is visually exposed and on which contents are displayed through pixels. For example, the display area may include the first surface 310A and the first areas 310D of the side surface.

The display area 310A and 310D may include a sensing area that is configured to obtain biometric information of a user. When the display area 310A and 310D includes the sensing area, this may mean that at least a portion of the sensing area overlaps the display area 310A and 310D. For example, the sensing area may refer to an area capable of displaying contents by the display 301 like the other areas of the display area 310A and 310D and additionally obtaining biometric information (e.g., a fingerprint) of the user.

The display area 310A and 310D of the display 301 includes a camera area 306. The camera area 306 may be an area through which light reflected from an object and received to the first camera module 305 passes. For example, the camera area 306 may include an area through which the optical axis of the first camera module 305 (e.g., an optical axis OA of FIG. 4) passes. When the display area 310A and 310D includes the camera area 306, this may mean that at least a portion of the camera area 306 overlaps the display area 310A and 310D. For example, similar to the other areas of the display area 310A and 310D, the camera area 306 may display contents by the display 301.

The screen display area 310A and 310D of the display 301 may include an area through which the first camera module 305 (e.g., a punch hole camera) is visually exposed. For example, at least a portion of the periphery of the area through which the first camera module 305 is exposed may be surrounded by the screen display area 310A and 310D. The first camera module 305 may include a plurality of camera modules.

The display 301 includes, on the rear surface of the screen display area 310A and 310D, at least one of the audio modules 303, 304, and 307, the sensor module, a camera module, and the light emitting element. For example, the electronic device 300 may include the camera module (e.g., the first camera module 305) disposed on the rear side (e.g., the side facing the −z-axis direction) of the first surface 310A (e.g., the front surface) and/or the side surface 310C (e.g., at least one surface of the first areas 310D) to face toward the first surface 310A and/or the side surface 310C. For example, the first camera module 305 may include an under display camera (UDC) that is hidden without being visually exposed on the screen display area 310A and 310D.

The display 301 may include, or may be disposed adjacent to, touch detection circuitry, a pressure sensor for measuring the intensity (pressure) of a touch, and/or a digitizer for detecting a stylus pen of a magnetic field type.

The audio modules 303, 304, and 307 include the microphone holes 303 and 304 and the speaker hole 307.

The microphone holes 303 and 304 include the first microphone hole 303 formed in a partial area of the side surface 310C and the microphone hole 304 formed in a partial area of the second surface 310B. Microphones for obtaining external sounds may be disposed in the housing 310 to correspond to the microphone holes 303 and 304. The microphones may each include a plurality of microphones to detect the direction of a sound. The second microphone hole 304 formed in the partial area of the second surface 310B may be disposed adjacent to the camera modules 305 and 312. For example, the second microphone hole 304 may obtain sounds when the camera modules 305 and 312 are executed, or may obtain sounds when other functions are executed.

The speaker hole 307 may include a receiver hole for telephone call. The speaker hole 307 may be formed in a portion of the side surface 310C of the electronic device 300. The speaker hole 307, together with the microphone hole 303, may be implemented as a single hole. Although not illustrated, the receiver hole for telephone call may be formed in another portion of the side surface 310C. For example, the receiver hole for telephone call may be formed in another portion (e.g., a portion facing the +Y-axis direction) of the side surface 310C that faces the portion (e.g., a portion facing the −Y-axis direction) of the side surface 310C in which the speaker hole 307 is formed.

The electronic device 300 may include a speaker fluidly connected with the speaker hole 307. The speaker may include a piezoelectric speaker that does not have the speaker hole 307.

The sensor module may generate an electrical signal or a data value that corresponds to an operational state inside the electronic device 300 or an environmental state external to the electronic device 300. The sensor module may be disposed on at least a part of the first surface 310A, the second surface 310B, or the side surfaces 310C (e.g., the first areas 310D and/or the second areas 310E) of the housing 310 and may be disposed on the rear surface of the display 301. For example, at least a portion of the sensor module may be disposed under the display area 310A and 310D and may not be visually exposed, and the sensing area may be formed in at least a portion of the display area 310A and 310D. For example, the sensor module may include an optical fingerprint sensor. The fingerprint sensor may be disposed on the second surface 310B as well as the first surface 310A of the housing 310 (e.g., the screen display area 310A and 310D). For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, and an illuminance sensor.

The key input devices 317 are disposed on the side surface 310C of the housing 310 (e.g., the first areas 310D and/or the second areas 310E). The electronic device 300 may not include all or some of the key input devices 317, and the key input devices 317 not included may be implemented in a different form, such as a soft key, on the display 301. The key input devices may include a sensor module that forms the sensing area that is included in the display area 310A and 310D.

The connector hole 308 may accommodate a connector. The connector hole 308 may be disposed in the side surface 310C of the housing 310. For example, the connector hole 308 may be disposed in the side surface 310C so as to be adjacent to at least a part of the audio modules (e.g., the microphone hole 303 and the speaker hole 307). The electronic device 300 may include the first connector hole 308 capable of accommodating a connector (e.g., a USB connector) for transmitting/receiving power and/or data with an external electronic device, and/or a second connector hole capable of accommodating a connector (e.g., an earphone jack) for transmitting/receiving audio signals with an external electronic device.

The electronic device 300 may include the light emitting element. For example, the light emitting element may be disposed on the first surface 310A of the housing 310. The light emitting element may provide state information of the electronic device 300 in the form of light. The light emitting element may provide a light source that operates in conjunction with operation of the first camera module 305. For example, the light emitting element may include an LED, an IR LED, and/or a xenon lamp.

The camera modules 305 and 312 includes the first camera module 305 (e.g., a UDC) configured to receive light through the camera area 306 in the first surface 310A of the electronic device 300, the second camera module 312 configured to receive light through a partial area of the second surface 310B (e.g., a rear camera area 384 of FIG. 3C), and/or a flash 313.

The first camera module 305 may include a UDC disposed on the rear surface of the display 301. For example, the first camera module 305 may be located in some layers of the display 301, or may be located such that an optical axis of a lens (e.g., the optical axis (OA) of FIG. 4) passes through the display area 310A and 310D of the display. The first camera module 305 may be configured to receive light through the camera area 306 included in the display area 310A and 310D. For example, the camera area 306 may be configured to display contents like the other areas of the display area 310A and 310D when the first camera module 305 does not operate. For example, when the first camera module 305 operates, the camera area 306 may not display contents, and the first camera module 305 may receive light through the camera area 306.

The first camera module 305 (e.g., a punch hole camera) may be exposed through a portion of the display area 310A and 310D of the display 301. For example, the first camera module 305 may be exposed on a partial area of the screen display area 310A and 310D through an opening formed in a portion of the display 301.

The second camera module 312 may include a plurality of camera modules (e.g., a dual camera, a triple camera, or a quad camera). However, the second camera module 312 is not necessarily limited to including the plurality of camera modules and may include one camera module.

The first camera module 305 and/or the second camera module 312 may include one or more lenses, an image sensor, and/or an image signal processor. The flash 313 may include, for example, a light emitting diode or a xenon lamp. Two or more lenses (an infrared camera lens, a wide angle lens, and a telephoto lens) and image sensors may be disposed in the housing to face toward one surface (e.g., the second surface 310B) of the electronic device 300.

Referring to FIG. 3C, the electronic device 300 includes the side bezel structure 318, a first support member 340 (e.g., a bracket), the front plate 320, a display 330, a printed circuit board 350 (e.g., a printed circuit board (PCB), a flexible PCB (FPCB), or a rigid-flexible PCB (RFPCB)), a battery 352, a second support member 360 (e.g., a rear case), an antenna 370, and the back plate 380. The electronic device 300 may not include at least one component (e.g., the first support member 340 or the second support member 360) among the aforementioned components, or may additionally include other component(s). At least one of the components of the electronic device 300 may be identical or similar to at least one of the components of the electronic device 300 of FIG. 3A or 3B, and repetitive descriptions are be omitted.

The first support member 340 is disposed inside the electronic device 300 and may be connected with the side bezel structure 318, or may be integrally formed with the side bezel structure 318. The first support member 340 may be formed of, for example, a metallic material and/or a nonmetallic (e.g., polymer) material. The display 330 may be coupled to, or located on, one surface of the first support member 340, and the printed circuit board 350 may be coupled to, or located on, an opposite surface of the first support member 340.

A processor, memory, and/or an interface may be disposed on the printed circuit board 350. The processor may include, for example, one or more of a central processing unit, an application processor, a graphic processing unit, an image signal processor, a sensor hub processor, or a communication processor.

The memory may include, for example, volatile memory or nonvolatile memory.

The interface may include, for example, a high definition multimedia interface (HDMI), a universal serial bus (USB) interface, an SD card interface, and/or an audio interface. For example, the interface may electrically or physically connect the electronic device 300 with an external electronic device and may include a USB connector, an SD card/MMC connector, or an audio connector.

The battery 352 may supply electric power to at least one component of the electronic device 300. The battery 152 may include, for example, a primary cell that is not rechargeable, a secondary cell that is rechargeable, or a fuel cell. At least a portion of the battery 352, for example, may be disposed on substantially the same plane as the printed circuit board 350. The battery 352 may be integrally disposed inside the electronic device 300, or may be disposed so as to be detachable from the electronic device 300.

The antenna 370 may be disposed between the back plate 380 and the battery 352. The antenna 370 may include, for example, a near field communication (NFC) antenna, a wireless charging antenna, and/or a magnetic secure transmission (MST) antenna. For example, the antenna 370 may perform short-range communication with an external device, or may wirelessly transmit and receive power required for charging. An antenna structure may be formed by a portion of the side bezel structure 318 and/or a portion of the first support member 340, or a combination thereof.

The first camera module 305 may be coupled to the rear surface of the display 330 to receive light through the camera area 306 of the front plate 320. For example, at least a portion of the first camera module 305 may be disposed on the first support member 340. For example, an image sensor of the first camera module 305 may receive light passing through the camera area 306 and a pixel array included in the display 330. For example, the camera area 306 may at least partially overlap the display area on which contents are displayed. For example, the optical axis OA of the first camera module 305 may pass through a partial area of the display 330 and the camera area 306 of the front plate 320. For example, the partial area may include a pixel array including a plurality of light emitting elements. A partial area of the display 330 that faces the first camera module 305 may be formed to be a transmissive area having a specified transmittance as a portion of the display area where contents are displayed. The transmissive area may be formed to have a transmittance of about 5% to about 25%. The transmissive area may be formed to have a transmittance of about 25% to about 50%. The transmissive area may be formed to have a transmittance of about 50% or more. The transmissive area may include an area through which light for generating an image by being focused on an image sensor passes and that overlaps an effective area (e.g., a field of view (FOV)) of the first camera module 305. For example, the transmissive area of the display 330 may include an area having a lower pixel density and/or wiring density than a surrounding area.

The second camera module 312 may be disposed such that a lens is exposed through the rear camera area 384 of the back plate 380 of the electronic device 300. The rear camera area 384 may be formed in at least a portion of a surface of the back plate 380. The second camera area 384 may be formed to be at least partially transparent such that the second camera module 312 receives external light through the second camera area 384.

At least a portion of the rear camera area 384 may protrude to a predetermined height from the surface of the back plate 380. However, without being necessarily limited thereto, the rear camera area 384 may form substantially the same plane as the surface of the back plate 380.

Figure 4:
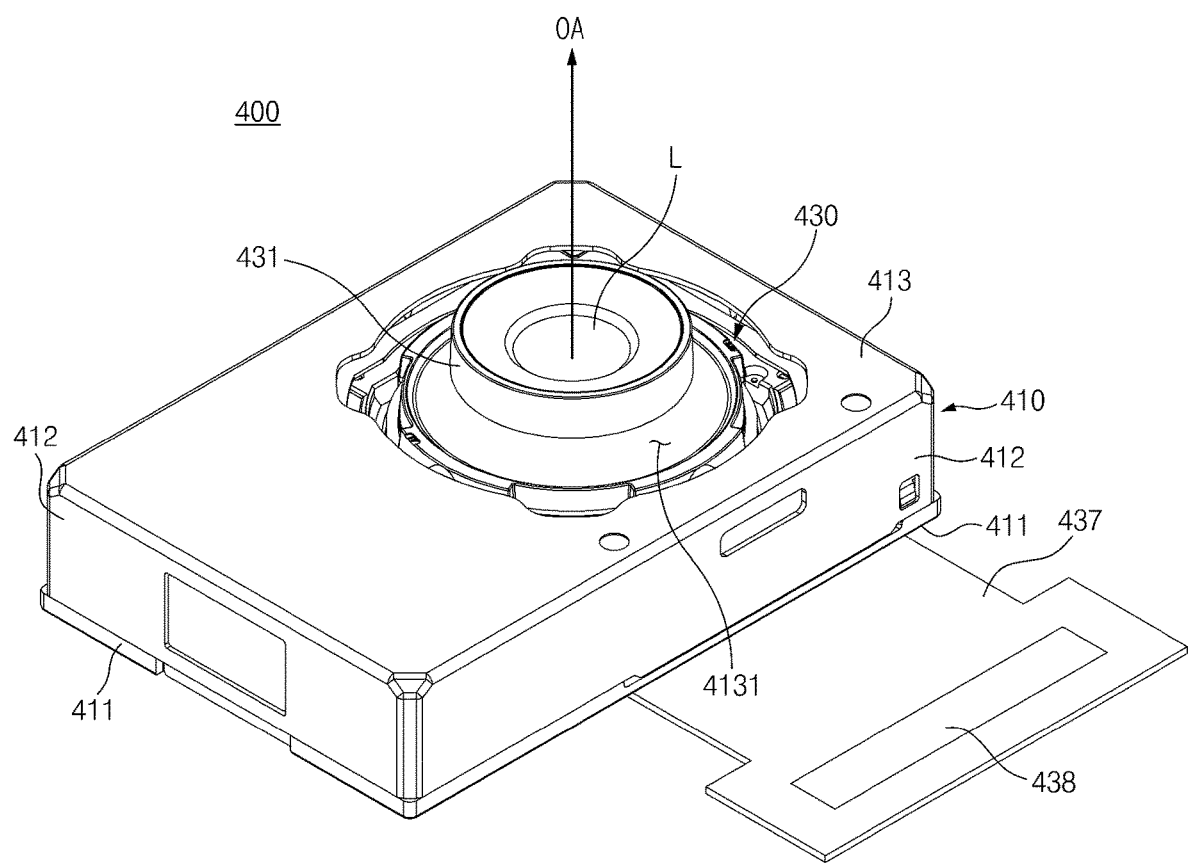
FIG. 4 is a diagram illustrating a perspective view of a camera module, according to an embodiment.

FIG. 4 is a diagram illustrating a perspective view of the camera module, according to an embodiment.

A camera module 400 includes a camera housing 410 and a lens assembly 430 at least partially accommodated in the camera housing 410. The camera module 400 may be configured to receive external light through a partial area of a surface of an electronic device.

The camera housing 410 includes a bottom surface 411, an upper surface 413, and a side surface 412. The upper surface 413 has an opening 4131 formed therein through which a lens L and at least a portion of a lens barrel 431 are exposed. The opening 4131 may be at least partially aligned with the optical axis OA of the lens L. The side surface 412 may surround the inner space between the bottom surface 411 and the upper surface 413.

An image sensor and a circuit board electrically connected with the image sensor 230 may be disposed on the bottom surface 411 of the camera housing 410. The image sensor 230 may be disposed in the camera housing 410 so as to be at least partially aligned with the optical axis OA of the lens L. For example, the image sensor 230 may convert an optical signal received through the lens L into an electrical signal.

At least a portion of the lens assembly 430 may be accommodated in the camera housing 410. For example, a portion of the lens assembly 430 may extend outside the camera housing 410 through the opening 4131.

The lens assembly 430 includes a plurality of lenses L and the lens barrel 431 surrounding the plurality of lenses L. The camera assembly 430 may be disposed such that the plurality of lenses L and at least a portion of the lens barrel 431 are exposed through the opening 4131 of the camera housing 410.

The camera housing 400 may be electrically connected with the electronic device through a connecting member 437. For example, the connecting member 437 may include a connector 438 coupled to a printed circuit board of the electronic device 300. The connecting member 437 may include a circuit board including a flexible area that is at least partially flexible.

The connecting member 437 may extend from the inner space of the camera housing 410 to the outside of the camera housing 410 (e.g., to the printed circuit board 350 of FIG. 3C).

The connecting member 437 may include an area on which the image sensor 432 is disposed or that is electrically connected with the image sensor 432. For example, the connecting member 437 may be a FPCB including the circuit board 433 of FIG. 5.

Figure 5:
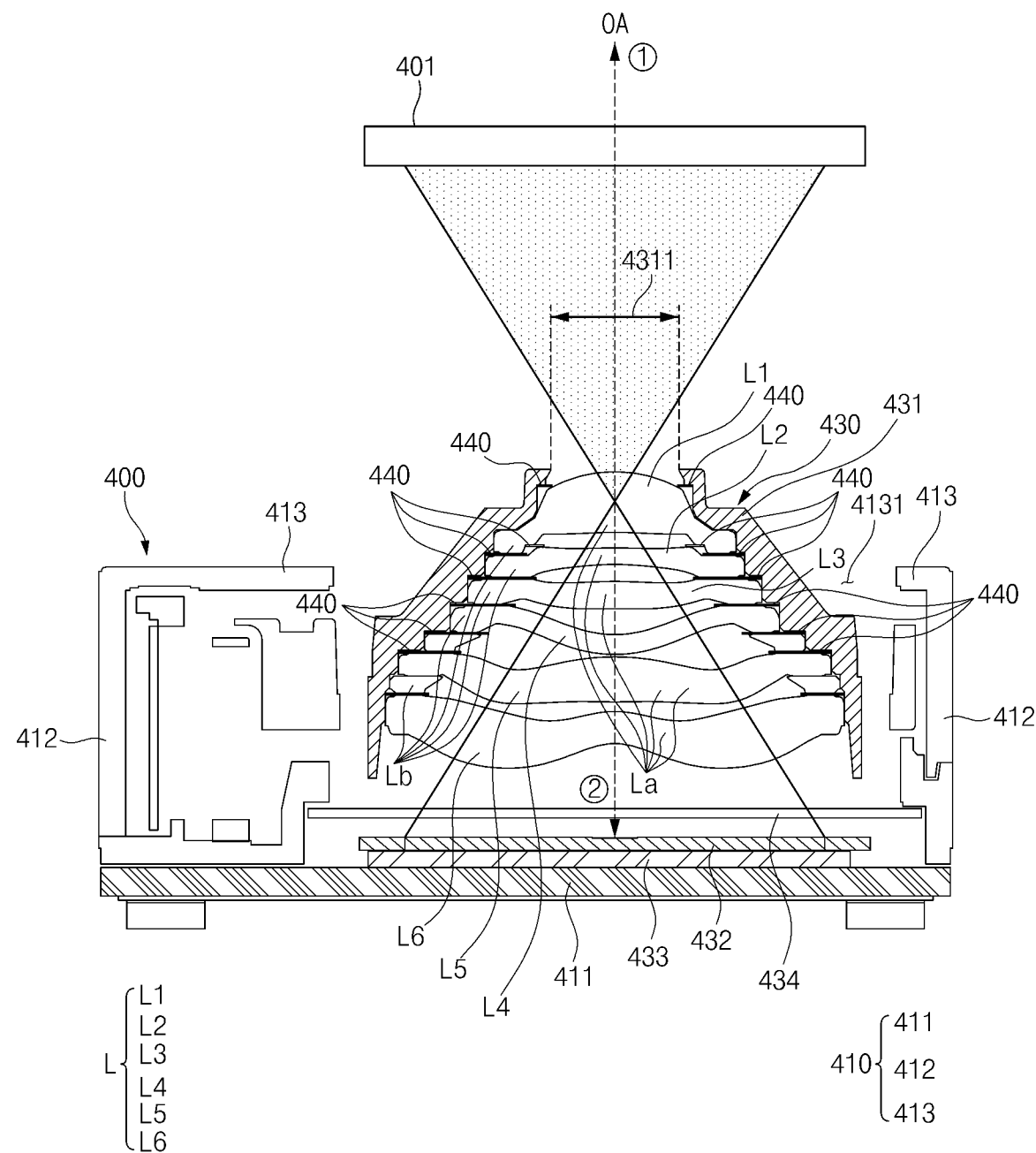
FIG. 5 is a diagram illustrating a sectional view of the camera module, according to an embodiment.

FIG. 5 is a diagram illustrating a sectional view of the camera module, according to an embodiment.

In an embodiment, the camera module 400 includes the camera housing 410, the image sensor 432, an optical filter 434, the circuit board 433, and the lens assembly 430. The image sensor 432, the optical filter 434, and the circuit board 433 may be disposed in the camera housing 410. At least a portion of the lens assembly 430 may be disposed in the camera housing 410.

Referring to FIG. 5, the direction of the optical axis OA may include a first optical axis direction 1 and a second optical axis direction 2. The first optical axis direction 1 may be defined as a direction toward an object 401, and the second optical axis direction 2 may be defined as a direction toward the image sensor 432.

The image sensor 432 may be disposed adjacent to the bottom surface 411 of the camera housing 410. The image sensor 432 may be electrically connected to the circuit board 433. For example, the image sensor 432 may be located on a surface of the circuit board 433. The image sensor 432 may be at least partially aligned with the optical axis OA. The image sensor 432 may be configured to receive external light passing through the plurality of lenses L and generate an image-related electrical signal based on the external light. The electrical signal may be electrically connected with a processor of an electronic device through a connector (e.g., the connector 438 of FIG. 4).

The optical filter 434 may be disposed in the camera housing 410 and may be spaced apart from the image sensor 432 at a predetermined interval. The optical filter 434 may be disposed between the image sensor 432 and the lenses L when viewed in the direction of the optical axis OA. An air gap may be formed between the optical filter 434 and the image sensor 432. The optical filter 434 may have a larger area than the image sensor 432. In various embodiments, the optical filter 434 may include an IR filter (an IR cut off filter) configured to block part of the infrared band.

The circuit board 433 may be disposed on the bottom surface 411 of the camera housing 410, or may form a portion of the bottom surface 411 of the camera housing 410. The circuit board 433 may be electrically connected with the image sensor 432. The circuit board 433 may be electrically connected to the connecting member 437 of FIG. 4, or may be a partial area of the connecting member 437.

The lens assembly 430 includes the plurality of lenses L, the lens barrel 431 surrounding the plurality of lenses L, and spacers 440, each of which is disposed between adjacent lenses.

The lens barrel 431 may extend outside the camera housing 410 through the opening 4131 formed in the upper surface 413 of the camera housing 410. A step structure may be formed on the inner surface of the lens barrel 431. At least some of the plurality of lenses L or the spacers 440 may be attached to step surfaces of the step structure of the lens barrel 431. The lens barrel 431 may not protrude outside the camera housing 410. The lens barrel 431 may have, in an upper surface 413 thereof, an opening 4311 through which a first lens L1 is partially exposed. The opening 4311 may function as an aperture of the camera module 400.

Each of the plurality of lenses L may include one of a spherical lens and an aspheric lens. For example, the aspheric lens may include a flat lens whose optical portion La is substantially flat. In an embodiment, the optical axis OA may be defined as a line connecting the centers of curvature of lens surfaces of the plurality of lenses L.

The plurality of lenses L may include the first lens L1 closest to the object and a sixth lens L6 closest to the image sensor 432. The plurality of lenses L may further include a second lens L2, a third lens L3, a fourth lens L4, and a fifth lens L5 that are disposed between the first lens L1 and the sixth lens L6. Referring to the drawing, the camera module is illustrated as including the six lenses L1, L2, L3, L4, L5, and L6. However, the camera module is not limited thereto and may include various numbers of lenses.

The plurality of lenses L may each include an optical portion La through which external light passes and a peripheral portion Lb formed around the optical portion La. Light passing through the optical portion La may be light reflected from the object 401. The light reflected from the object 401 may be refracted while passing through the lenses L. The peripheral portions Lb of the plurality of lenses L may be areas mounted on the inner surface of the lens barrel 431.

The peripheral portions Lb may include areas that at least partially make contact with the spacers 440 and/or the step structure of the lens barrel 431. At least one of the plurality of lenses L may be attached to the step structure of the lens barrel 431 through the spacer 440. The peripheral portions Lb of adjacent lenses among the plurality of lenses L may be disposed to be stacked with the spacer 440 therebetween. For example, the peripheral portions Lb may include flat areas whose normal vectors are substantially parallel to the optical axis OA.

Each of the spacers 440 may be disposed between adjacent lenses. For example, the spacer 440 may at least partially make contact with the peripheral portions Lb of the adjacent lenses. A partial area of the spacer 440 may make direct contact with the step structure of the lens barrel 431. The spacer 440 may prevent direct contact between the lenses L. For example, the spacer 440 may space the adjacent lenses apart from each other at a predetermined interval. An air gap may be formed between the adjacent lenses by the spacer 440. For example, the spacer 440 may prevent the lenses L from being damaged by an external impact. The spacer 440 may contain a material capable of absorbing an impact. For example, the spacer 440 may contain polyethylene terephthalate (PET) or polyimide (PI). The spacer 440 may contain a metallic material.

Some of the plurality of spacers 440 may be disposed between the lenses L and the inner surface of the lens barrel 431. For example, referring to FIG. 5, a part of the plurality of spacers 440 may be disposed between the first lens L1 and the peripheral portion of the opening 4311 of the lens barrel 431.

The spacers 440 may be formed in ring shapes surrounding opening areas (e.g., opening areas 448 of FIG. 5). The spacers 440 may be formed such that the opening areas 448 are at least partially aligned with the optical portions La of the lenses L. For example, the optical axis OA may pass through the opening areas 448 of the spacers 440. The spacers 440 may have various thicknesses. For example, the spacers 440 may have a thickness of about 0.01 mm to about 0.2 mm. Referring to the drawing, the spacer disposed between the fourth lens L4 and the fifth lens L5 and the spacer disposed between the fifth lens L5 and the sixth lens L6 may have a greater thickness than the other spacers. Two spacers may be disposed between the first lens L1 and the second lens L2. For example, one of the two spacers may have a larger size than the other. In various embodiments, at least one of the plurality of spacers 440 may function as an aperture of the camera module 400.

Figure 6:
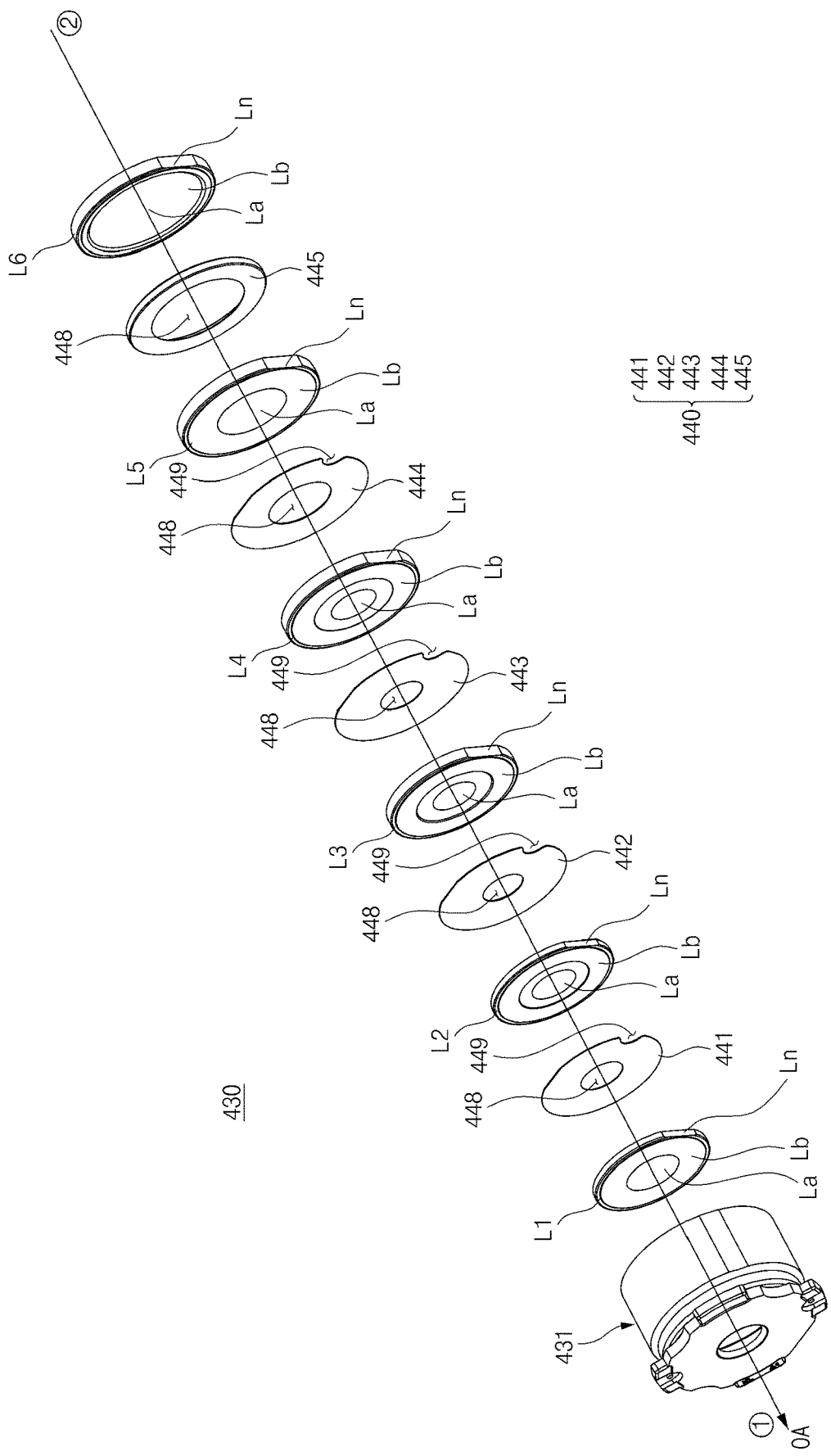
FIG. 6 is a diagram illustrating an exploded perspective view of a lens barrel of the camera module, according to an embodiment.

FIG. 6 is a diagram illustrating an exploded perspective view of the lens barrel of the camera module, according to an embodiment.

Referring to FIG. 6, the spacers 440 include a plurality of spacers 441, 442, 443, 444, and 445, each of which is located between adjacent lenses. For example, the first spacer 441 may be disposed between the first lens L1 and the second lens L2. The second spacer 442 may be disposed between the second lens L2 and the third lens L3. The third spacer 443 may be disposed between the third lens L3 and the fourth lens L4. The fourth spacer 444 may be disposed between the fourth lens L4 and the fifth lens L5. The fifth spacer 445 may be disposed between the fifth lens L5 and the sixth lens L6.

The spacers 440 may have annular plate shapes having the opening areas 448 defined therein. The spacers 440 may be configured such that when viewed in the direction of the optical axis OA, the opening areas 448 partially overlap the optical portions La of the lenses L and at least partially make contact with the peripheral portions Lb of the lenses L.

At least some of the plurality of spacers 440 may have notches 449 formed therein. For example, the notches 449 may have shapes in which the outer peripheries of the spacers 440 are recessed toward the opening areas 448. The notches 449 of the spacers 440 may be configured to indicate the directions of the spacers 440. For example, the spacers 440 may be disposed such that the notches 449 of the spacers 440 are located in specified positions. For example, the spacers 440 and the lenses L may be disposed such that the notches 449 of the spacers 440 and notches Ln of the lenses L are aligned in the direction of the optical axis OA. Although FIG. 6 illustrates an example in which at least some of the plurality of spacers 440 include the notches 449, the spacers 440 may include various indication means capable of specifying the assembly directions and/or the assembly positions of the spacers 440. For example, the various indication means may include letters, numbers, and/or symbols engraved on surfaces of the spacers 440. For example, the various indication means may be provided such that both sides of the spacers 440 have different colors and/or different patterns. The indication means of the spacers 440 may include visual indication means that can be recognized by spacer assembly equipment capable of vision recognition.

The notches 449 may not be formed in a part (e.g., the fifth spacer 445) of the plurality of spacers 440. For example, in the case of a spacer (e.g., the fifth spacer 445) located in a portion where little or no internal reflection by the spacer occurs, it is not necessary to specify the assembly direction and/or the assembly position of the spacer, and therefore, the notches 449 may be omitted.

The spacers 440 may be formed such that the sizes of the opening areas 448 are increased from the first optical axis direction 1 (e.g., a direction toward the object) to the second optical axis direction 2 (e.g., a direction toward the image sensor). For example, among the plurality of spacers 440, the first spacer 441 may include a first opening area having a first size, and the second spacer 442 located in the second optical axis direction 2 with respect to the first spacer 441 may include a second opening area having a second size greater than or equal to the first size. However, the sizes of the opening areas 448 are not necessarily limited to the above embodiment.

Figure 7:
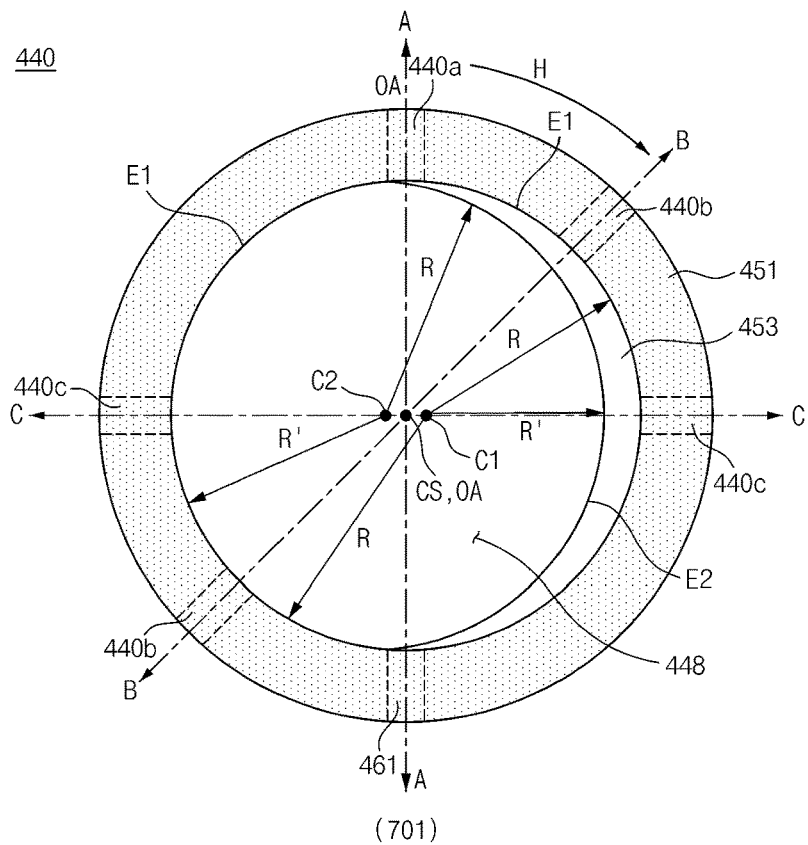
FIG. 7 is a diagram illustrating a spacer of the camera module, according to an embodiment.
Figure 7:
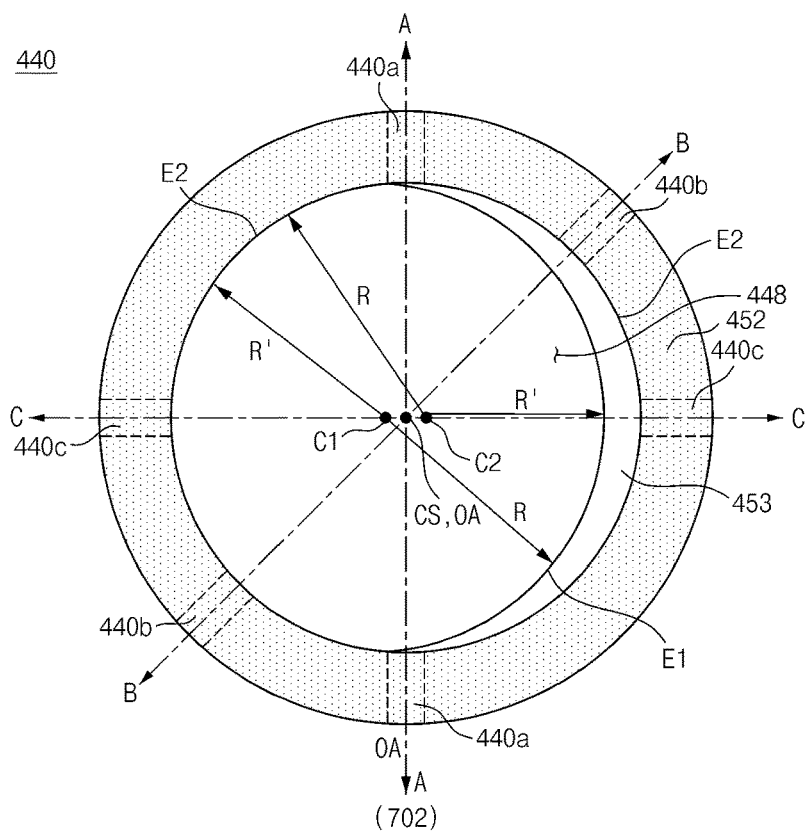

FIG. 7 is a diagram illustrating a spacer of the camera module, according to an embodiment.

Portion 701 of FIG. 7 is a view illustrating the spacer 440 when a first surface 451 of the spacer 440 is viewed from above. Portion 702 of FIG. 7 is a view illustrating the spacer 440 when a second surface 452 of the spacer 440 is viewed from above.

In an embodiment, the spacer 440 includes the first surface 451, the second surface 452, and an inner surface 453. The first surface 451 and the second surface 452 may include an area attached to a lens adjacent thereto. An opening area 448 may be formed through the first surface 451 and the second surface 452. A first circular periphery E1 defining the opening area 448 may be formed on the first surface 451, and a second circular periphery E2 defining the opening area 448 may be formed on the second surface 452. The inner surface 453 may include an area connecting the first circular periphery E1 and the second circular periphery E2. The first circular periphery E1 and the second circular periphery E2, when viewed from above (e.g., when viewed in the direction of the optical axis OA), may have a circular shape with the same radius R.

The inner surface 453 of the spacer 440 may be formed to be inclined. For example, when the first surface 451 or the second surface 452 of the spacer 440 is viewed from above, a portion of the inner surface 453 may be visible, and another portion of the inner surface 453 may be hidden.

The first circular periphery E1 and the second circular periphery E2 may be circles having the same radius R. The center C1 of the first circular periphery E1 may not coincide with the center C2 of the second circular periphery E2. For example, when the first surface 451 or the second surface 42 of the spacer 440 is viewed from above, the opening area 448 of the spacer 440 may look like two semicircles that have the different centers C1 and C2 and that are connected with each other.

Referring to 701 of FIG. 7, when the first surface 451 of the spacer 440 is viewed from above, the periphery of the opening area 448 may include a portion of the first circular periphery E1 and a portion of the second circular periphery E2. For example, a portion of the periphery of the opening area 448 may be spaced apart from the center C1 of the first circular periphery E1 by the radius R, and another portion of the periphery of the opening area 448 may be spaced apart from the center C1 of the first circular periphery E1 by R' smaller than the radius R.

Referring to 702 of FIG. 7, when the second surface 452 of the spacer 440 is viewed from above, the periphery of the opening area 448 may include a portion of the first circular periphery E1 and a portion of the second circular periphery E2. For example, a portion of the periphery of the opening area 448 may be spaced apart from the center C2 of the second circular periphery E2 by the radius R, and another portion of the periphery of the opening area 448 may be spaced apart from the center C2 of the second circular periphery E2 by R' smaller than the radius R.

The optical axis OA may intersect a line connecting the center C1 of the first circular periphery E1 and the center C2 of the second circular periphery E2. The point where the optical axis OA intersects the line may be defined as the center CS of the spacer 440.

Referring again to 701 of FIG. 7, when the first surface 451 of the spacer 440 is viewed from above, a circumferential direction H surrounding the opening area 448 may be defined. For example, the circumferential direction H may be a direction rotating in the clockwise or counterclockwise direction along the spacer with the optical axis OA as the center.

Referring to FIG. 7, first portions 440a, second portions 440b, and third portions 440c may be defined in the spacer 440 along the circumferential direction H. For example, the first portions 440a may be defined as portions where the inner surface 453 of the spacer 440 is not exposed when the spacer 440 is viewed from above. The third portions 440c may be defined as portions spaced apart from the first portions 440a by about 90 degrees in the circumferential direction H (e.g., the clockwise direction). The second portions 440b may be defined as portions spaced apart from the first portions 440a by an angle of less than 90 degrees in the circumferential direction (e.g., the clockwise direction).

Referring to 701 of FIG. 7, the first portions 440a may be located in the 12 o'clock and 6 o'clock directions with respect to the optical axis OA, and the second portions 440b may be located in the 1 o'clock and 7 o'clock directions with respect to the optical axis OA. The third portions 440c may be located in the 3 o'clock and 9 o'clock directions with respect to the optical axis OA. When the spacer 440 is viewed from above, the exposed area of the inner surface 453 of the spacer 440 may increase in the circumferential direction H (e.g., the clockwise direction) from the first portions 440a to the third portions 440c, and the exposed area of the inner surface 453 of the spacer 440 may decrease in the direction (e.g., the counterclockwise direction) opposite to the circumferential direction H from the third portions 440c to the first portions 440a. The third portions 440c may be portions where the area of the inner surface 453 of the spacer 440 is largest when the spacer 440 is viewed from above.

Figure 8A:
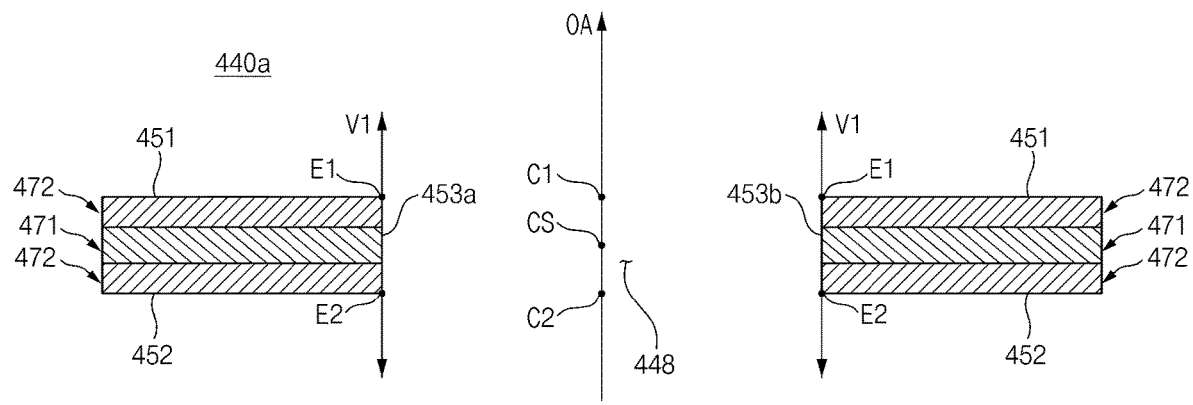
FIG. 8A is a diagram illustrating a sectional view of the spacer of the camera module, according to an embodiment.
Figure 8B:
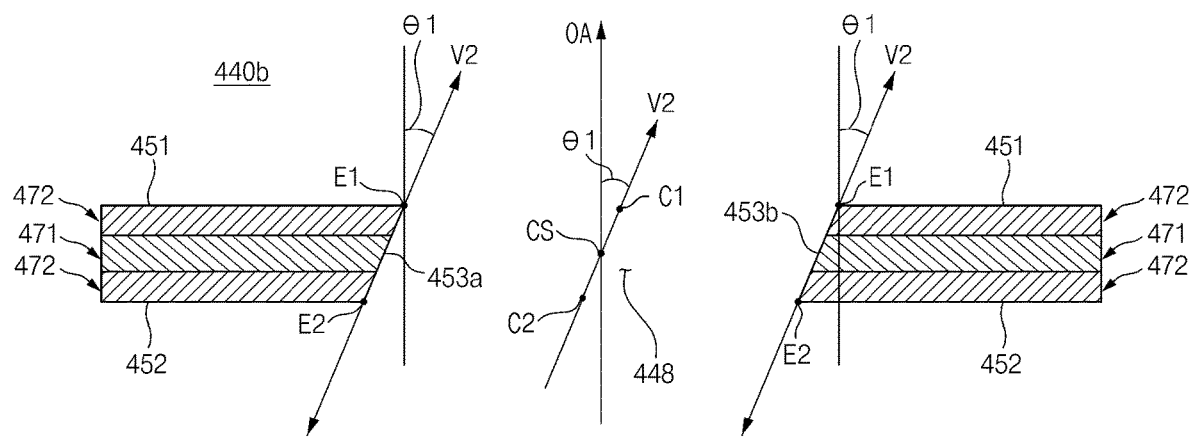
FIG. 8B is a diagram illustrating a sectional view of the spacer of the camera module, according to an embodiment.
Figure 8C:
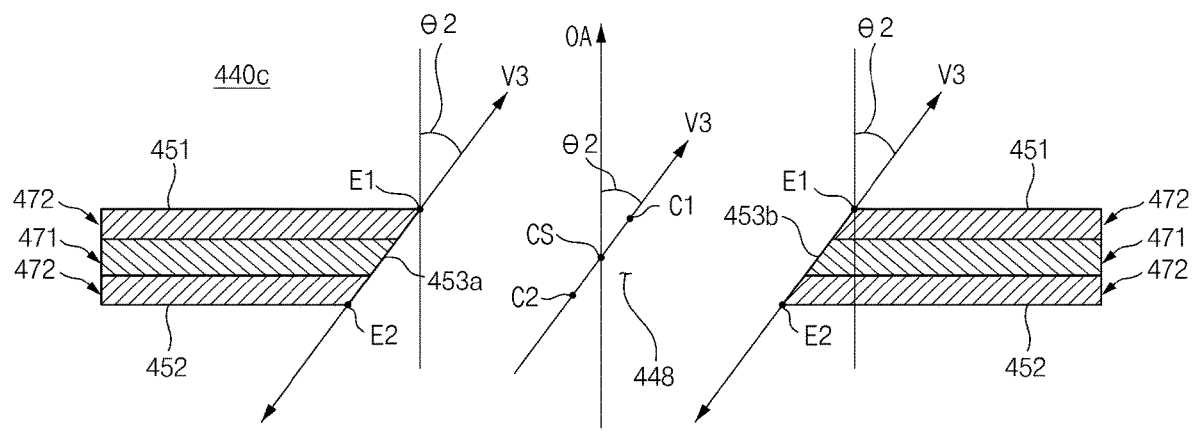
FIG. 8C is a diagram illustrating a sectional view of the spacer of the camera module, according to an embodiment.

FIG. 8A is a diagram illustrating a sectional view of the spacer of the camera module, according to an embodiment. FIG. 8B is a diagram illustrating a sectional view of the spacer of the camera module, according to an embodiment. FIG. 8C is a diagram illustrating a sectional view of the spacer of the camera module, according to an embodiment.

The sections in FIGS. 8A, 8B, and 8C may be sections including the optical axis OA. FIG. 8A illustrates the first portion 440a of the spacer 440, FIG. 8B illustrates the second portion 440b of the spacer 440, and FIG. 8C illustrates the third portion 440c of the spacer 440.

Referring to FIGS. 8A, 8B, and 8C, the spacer 440 may include one or more layers. The spacer 440 includes a base layer 471 and a coating layer 472 disposed on at least one surface of the base layer 471. For example, the coating layer 472 may form the first surface 451 and/or the second surface 452 of the spacer 440. The base layer 471 may include a PET film or a PI film. The coating layer 472 may include a black layer. For example, the coating layer 472 may include a carbon-coated layer. The coating layer 472 may be provided to decrease the reflectivity of the first surface 451 and/or the second surface 452 of the spacer 440. The black coating layer 472 may increase the light absorbance of the spacer 440 and may decrease the reflectivity of the spacer 440.

Hereinafter, the inner surface 453 of the spacer may include a first inner surface 453a and a second inner surface 453b illustrated on the left and right sides with the opening area 448 therebetween based on the sectional views. Referring to FIGS. 8A, 8B, and 8C, the spacer 440 may be formed such that the first inner surface 453a and the second inner surface 453b are parallel to each other when viewed on the cross-section including the optical axis OA.

Referring to the sectional view of the first portion 440a illustrated in FIG. 8A, the first inner surface 453a and the second inner surface 453b may be parallel to each other. The first inner surface 453a and the second inner surface 453b may extend parallel to the direction of the optical axis OA. For example, based on the section, a first vector V1 connecting the first circular periphery E1 and the second circular periphery E2 may be parallel to the direction of the optical axis OA. The line connecting the center C1 of the first circular periphery E1 and the center C2 of the second circular periphery E2 may be parallel to the optical axis OA.

Referring to the sectional view of the second portion 440b illustrated in FIG. 8B, the first inner surface 453a and the second inner surface 453b may be parallel to each other. The first inner surface 453a and the second inner surface 453b may be formed to be inclined with respect to the direction of the optical axis OA. For example, based on the section, a second vector V2 connecting the first circular periphery E1 and the second circular periphery E2 may form a predetermined first inclination angle θ1 with respect to the direction of the optical axis OA. For example, the first inclination angle θ1 may be smaller than the second inclination angle θ2. The line connecting the center C1 of the first circular periphery E1 and the center C2 of the second circular periphery E2 may form the first inclination angle θ1 with the optical axis OA.

Referring to the sectional view of the third portion 440c illustrated in FIG. 8C, the first inner surface 453a and the second inner surface 453b may be parallel to each other. The first inner surface 453a and the second inner surface 453b may be formed to be inclined with respect to the direction of the optical axis OA. For example, based on the drawing, a third vector V3 connecting the first circular periphery E1 and the second circular periphery E2 may form the predetermined second inclination angle θ2 with respect to the direction of the optical axis. The second inclination angle θ2 may be greater than the first inclination angle θ1. The line connecting the center C1 of the first circular periphery E1 and the center C2 of the second circular periphery E2 may form the second inclination angle θ2 with the optical axis OA.

Referring to FIGS. 7, 8A, 8B, and 8C, the inner surface 453 of the spacer 440 may extend parallel to the direction of the optical axis OA at the first portion 440a and may obliquely extend at the second inclination angle θ2 with respect to the direction of the optical axis OA at the third portion 440c spaced apart from the first portion 440a by about 90 degrees in the circumferential direction around the optical axis OA. Furthermore, the inclination angle may continuously increase from the first portion 440a toward the third portion 440c.

The cross-sectional area of the spacer 440 may continuously increase or decrease in the circumferential direction around the optical axis OA. For example, the first portion 440a of the spacer 440 may be a portion having a substantially rectangular cross-section.

Referring to FIG. 5, light reflected from the external object 401 may pass through the lenses L and may be introduced into the image sensor 432. A portion of the light passing through the lenses L may be reflected by the spacer 440. The reflection may be referred to as internal reflection in that the reflection occurs inside the lens barrel 431. When the reflected light by the internal reflection is introduced into the image sensor 432, the quality of an image may be degraded. For example, when the internally reflected light is received to the image sensor 432, a ghost phenomenon, a flare phenomenon, or a light blurring phenomenon may occur in the image. The camera module 400 may include the spacer 440 having a shape capable of suppressing internal reflection. For example, the spacer 440 may include the coating layer 472 capable of reducing the reflectivity of the first surface 451 and the second surface 452 and raising the absorbance of the first surface 451 and the second surface 452 and may decrease internal reflection accordingly. Furthermore, the spacer 440 may include the inner surface 453 inclined with respect to the optical axis OA. Accordingly, even when internal reflection occurs, the spacer 440 may reduce introduction of reflected light by the internal reflection into the image sensor 432.

Figure 9:
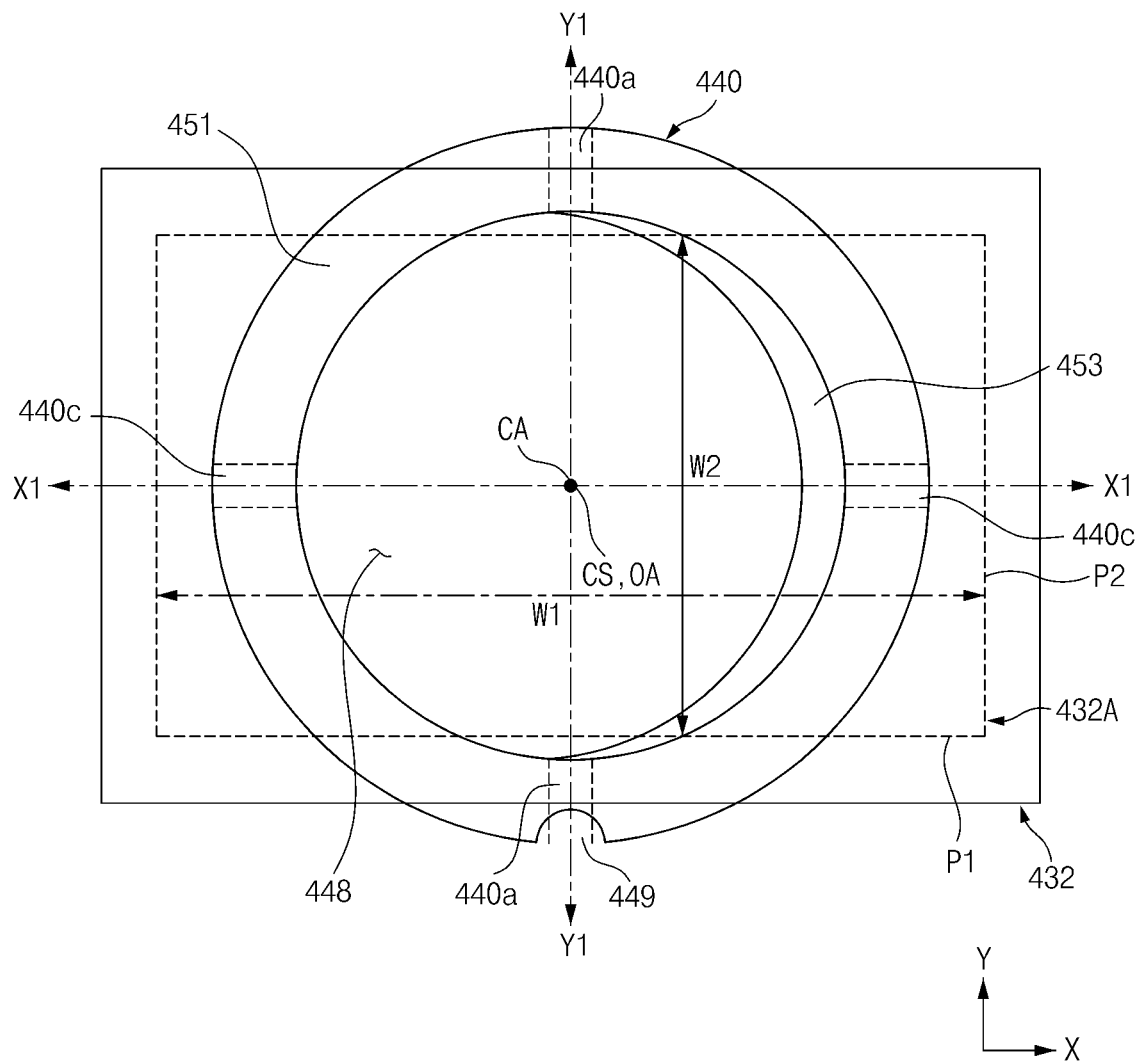
FIG. 9 is a diagram illustrating the spacer and an image sensor of the camera module, according to an embodiment.
Figure 10A:
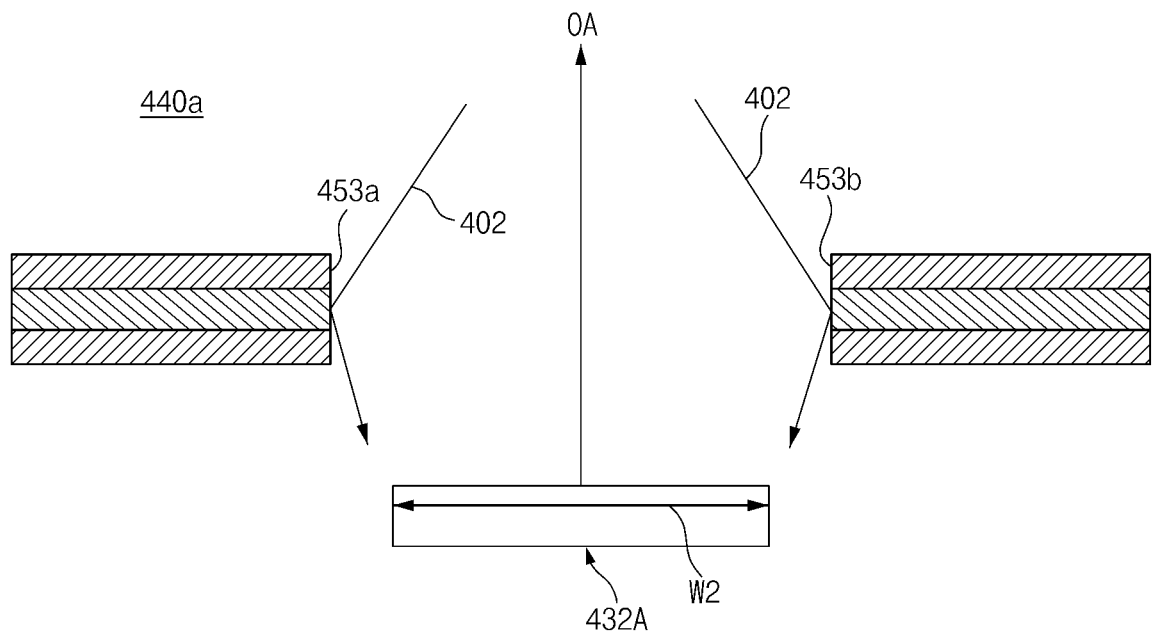
FIG. 10A is a diagram illustrating a sectional view of the spacer and the image sensor of the camera module, according to an embodiment.
Figure 10B:
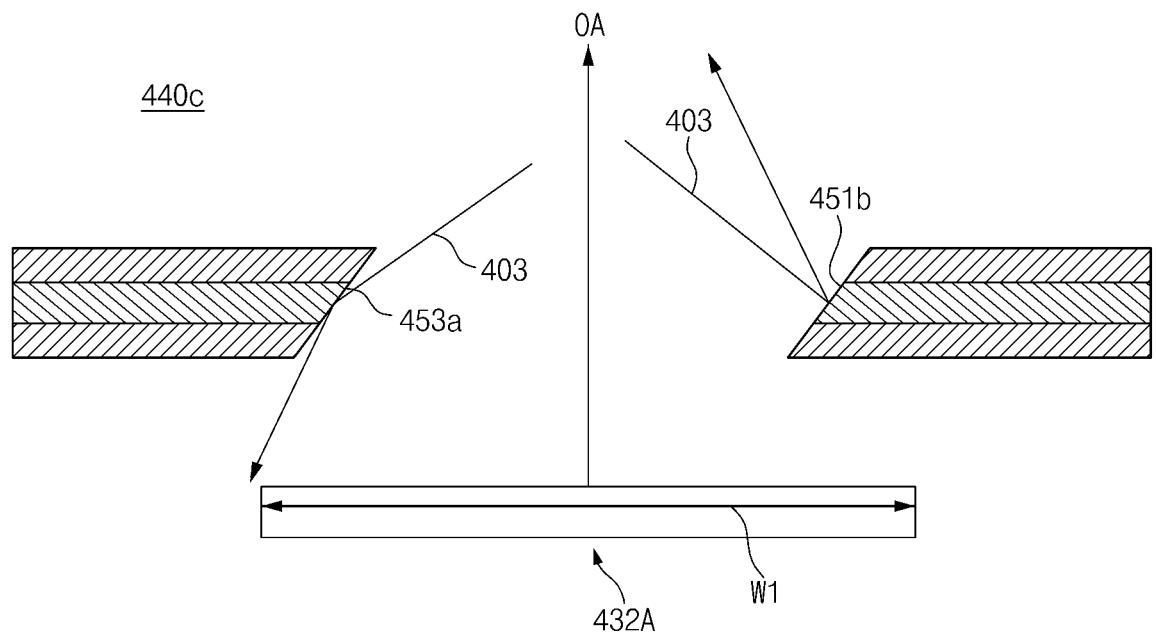
FIG. 10B is a diagram illustrating a sectional view of the spacer and the image sensor of the camera module, according to an embodiment.

FIG. 9 is a diagram illustrating the spacer and the image sensor of the camera module, according to an embodiment. FIG. 10A is a diagram illustrating a sectional view of the spacer and the image sensor of the camera module, according to an embodiment. FIG. 10B is a diagram illustrating a sectional view of the spacer and the image sensor of the camera module, according to an embodiment.

In an embodiment, the image sensor 432 may include an active area 432A configured to receive light and a peripheral area around the active area 432A. The active area 432A may have a substantially rectangular or square shape.

Referring to FIG. 9, when viewed in the direction of the optical axis OA, the image sensor 432 and the spacer 440 may at least partially overlap each other. For example, the active area 432A of the image sensor 432 may extend outside the spacer 440, or the spacer 440 may extend outside the active area 432A of the image sensor 432.

The active area 432A may include a first edge P1 extending a first length and a second edge P2 extending a second length smaller than the first length in a direction substantially perpendicular to the first edge P1. For example, the first edge P1 may extend in the x-axis direction (e.g., the long-side direction), and the second edge P2 may extend in the y-axis direction (e.g., the short-side direction). The first edge P1 and the second edge P2 may be perpendicular to the direction of the optical axis OA. The center CA of the active area 432A may be defined as the center in each of the first edge direction (e.g., the long-side direction) and the second edge direction (e.g., the short-side direction). The image sensor 432 may be disposed such that the optical axis OA passes through the center CA of the active area 432A.

The active area 432A may have a substantially rectangular shape with a first width W1 in the long-side direction and a second width W2 smaller than the first width W1 in the short-side direction.

The center CS of the spacer 440 may be the center of the line connecting the center C1 of the first circular periphery E1 and the center C2 of the second circular periphery E2 illustrated in FIG. 7. The spacer 440 may be disposed such that the optical axis OA passes through the center CS of the spacer 440.

The spacer 440 and the image sensor 432 may be disposed such that the center CS of the spacer 440 and the center CA of the active area 432A are located on the optical axis OA. For example, the center CS of the spacer 440 and the center CA of the active area 432A may be aligned with the optical axis OA. For example, the center CS of the spacer 440 may be spaced apart from the center CA of the active area 432A in a direction toward an object (e.g., the object 401 of FIG. 5) (e.g., the first optical axis direction 1 of FIG. 5).

Referring to FIGS. 10A and 10B, first reflected light 402 reflected from the first portion 440a of the spacer 440 may be more likely to be received to the active area 432A of the image sensor 432 than second reflected light 403 reflected from another portion (e.g., the second portion 440b or the third portion 440c of FIGS. 7, 8A, 8B, and 8C). For example, a portion of the first reflected light 402 may travel toward the optical axis OA and the image sensor 432.

Accordingly, the image sensor 432 and the spacer 440 may be aligned by an additional method other than that involving the center alignment CS, CA, and OA.

The spacer 440 and the image sensor 432 may be disposed such that the first portion 440a of the spacer 440 is located in the short-side direction (e.g., the y-axis direction or the direction of the second width W2) from the optical axis OA. The first portion 440a of the spacer 440, when viewed in the direction of the optical axis OA, may overlap an area adjacent to the first edge P1 (the long side) of the active area 432A.

The spacer 440 and the image sensor 432 may be disposed such that the third portion 440c of the spacer 440 is located in the long-side direction (e.g., the x-axis direction or the direction of the first width W1) from the optical axis OA. The third portion 440b of the spacer 440, when viewed in the direction of the optical axis OA, may overlap an area adjacent to the second edge P2 (the short side) of the active area 432A.

To specify the relative positions of the spacer 440 and the image sensor 432, a first virtual axis Y1 may be defined in the spacer 440. For example, the first virtual axis Y1 may be an axis that connects the first portions 440a of the spacer 440 and crosses the optical axis OA. The first virtual axis Y1 may connect the first portions 440a of the spacer 440 across the opening area 448. The spacer 440 and the image sensor 432 may be disposed such that the first virtual axis Y1 of the spacer 440 is parallel to the short-side direction (e.g., the y-axis direction) of the active area 432A. For example, the spacer 440 may be disposed such that the first portions 440a face each other in the short-side direction (e.g., the y-axis direction or the direction of the second width W2).

A second virtual axis X1 may be defined in the spacer 440. For example, the second virtual axis X1 may be an axis that connects the third portions 440c of the spacer 440 and crosses the optical axis OA. The spacer 440 and the image sensor 432 may be disposed such that the second virtual axis X1 of the spacer 440 is parallel to the long-side direction (e.g., the x-axis direction) of the active area 432A. For example, the spacer 440 may be disposed such that the third portions 440c face each other in the long-side direction (e.g., the x-axis direction or the direction of the first width W1).

As described above, the first portions 440a of the spacer 440 and the portion of the active area 432A that has a small width (e.g., the second width W2) may be disposed to overlap each other. Accordingly, even when internal reflection occurs, the camera module 400 according to an embodiment may decrease reflected light received to the image sensor 432, thereby providing improved image quality.

To locate the spacer 440 in a specified position and a specified direction, an indication means such as a notch (e.g., the notch 449 of FIG. 6) may be formed in the spacer 440. For example, the notch 449 may be formed in a position that is adjacent to the first portion 440a or has a previously determined positional relationship with the first portion 440a (e.g., a position spaced apart from the first portion 440a by a predetermined angle in the circumferential direction).

Figure 11A:
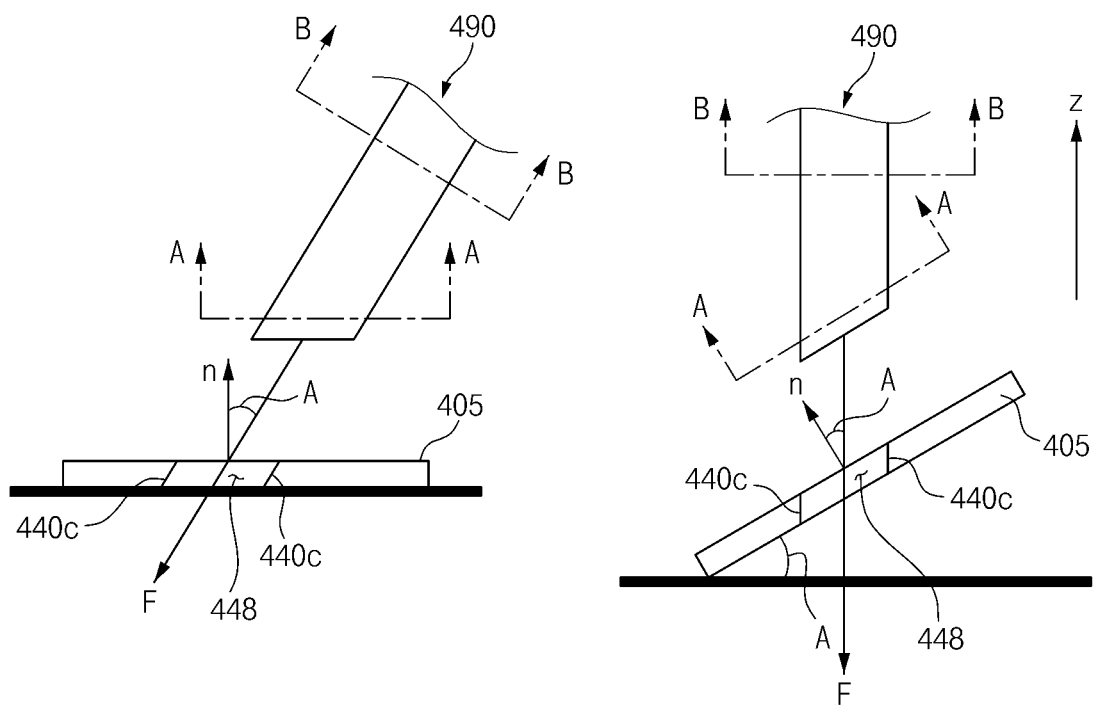
FIG. 11A is a diagram illustrating a part of a process of manufacturing the spacer of the camera module, according to an embodiment.
Figure 11B:
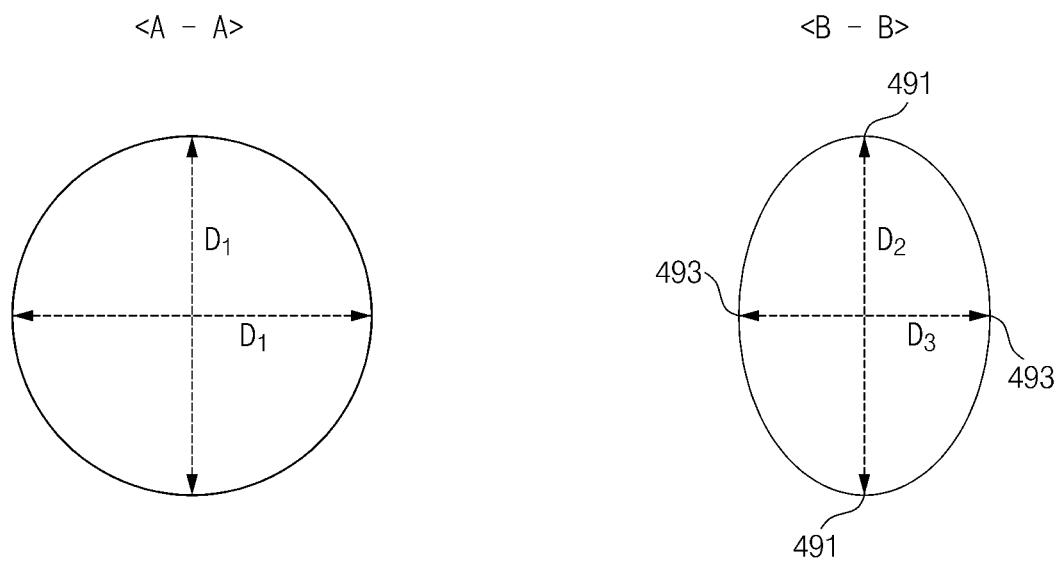
FIG. 11B is a diagram illustrating a part of a process of manufacturing the spacer of the camera module, according to an embodiment.

FIG. 11A is a diagram illustrating a part of a process of manufacturing the spacer of the camera module, according to an embodiment. FIG. 11B is a diagram illustrating a part of a process of manufacturing the spacer of the camera module, according to an embodiment.

Referring to FIGS. 11A and 11B, a method of manufacturing the spacer 440 may include preparing a plate 405 and forming an opening area 448 in the plate 405.

The plate 405 may include a plurality of stacked layers. For example, as illustrated in FIGS. 8A, 8B, and 8C, the stacked layers may include the base layer 471 and the coating layer 472 with which at least one surface of the base layer 471 is coated. The base layer 471 may include a PET film or a PI film. The coating layer 472 may include a black layer. For example, the coating layer 472 may include a carbon-coated layer containing carbon. The base layer 471 may include a metal layer containing a metallic material, and at least one surface of the metal layer may be coated with the coating layer 472. The plate 405 may be formed of one metal layer.

Referring to FIGS. 11A and 11B, the forming of the opening area 448 in the plate 405 may include a press working process of pressing a partial area of the plate 405 using a mold 490. The mold 490 may have a shape corresponding to the opening area 448 of the spacer 440. The mold 490 may be configured to move in a press direction F. The mold 490 may pass through the plate 405 in the press direction F to form the opening area 448 of the spacer 440.

The plate 405 and the mold 490 may be disposed at a predetermined angle A. For example, the plate 405 and the mold 490 may be disposed such that the normal vector n of the plate 405 and the press direction F of the mold 490 form the predetermined angle A.

Referring to FIG. 11A, for example, the plate 405 may be disposed on a horizontal jig facing the z-axis direction, and the mold 490 may move in the press direction F having the predetermined angle A with respect to the z-axis. In another example, the plate 405 may be disposed on a jig having the predetermined angle A with respect to the z-axis direction, and the mold 490 may move in the press direction F parallel to the z-axis.

The predetermined angle A may be equal to the second inclination angle $\theta2$ of the third portion 440c of the spacer 440, as illustrated in FIG. 8. For example, the mold 490 and the plate 405 may be disposed to form the second inclination angle $\theta2$, and the mold 490 may pass through the plate 405 to form the inner surface 453 of the third portion 440c that has the second inclination angle $\theta2$ with respect to the direction of the optical axis OA.

Referring to FIG. 11B, the mold 490 may have a circular cross-section when viewed on a section substantially perpendicular to the normal vector n of the plate 405. The circular cross-section may have the same shape as the first circular periphery E1 and the second circular periphery E2 illustrated in FIG. 7. For example, a first diameter D1 of the circular cross-section may be equal to twice the radius R of the first circular periphery E1 and the second circular periphery E2.

Referring to FIG. 11B, the mold 490 may have an oval cross-section when viewed on a section perpendicular to the press direction F. The oval cross-section may include a second diameter D2 and a third diameter D3 smaller than the second diameter D2. For example, the second diameter D2 may be equal to the first diameter D1 of the circular cross-section. For example, the second diameter D2 may be equal to twice the radius R of the first circular periphery E1 and the second circular periphery E2 illustrated in FIG. 7. For example, the third diameter D3 may be smaller than twice the radius R of the first circular periphery E1 and the second circular periphery E2 illustrated in FIG. 7. The second diameter D2 and the third diameter D3 may have the relation $D3=D2 \cos A$.

Portions 491 of the periphery of the oval cross-section that are connected by the second diameter D2 may form the first portions 440a of the spacer 440 illustrated in FIG. 7.

Portions 493 of the periphery of the oval cross-section that are connected by the third diameter D3 may form the third portions 440c of the spacer 440 illustrated in FIG. 7.

The method of manufacturing the spacer 440 may further include an additional post-treatment process performed to decrease the reflectivity after the opening area 448 is formed in the plate 405. When the plate 405 includes a metal layer, the additional post-treatment process may include a process (e.g., anodizing) of forming a film on a metal area exposed on the inner surface 453 of the spacer 440 or a process of painting the metal area exposed on the inner surface 453 of the spacer 440. For example, the painting process may improve the light absorbance and decrease the reflectivity by painting the metal area black. The additional post-treatment process may include a process of oxidizing a section of a PET film or a PI film exposed on the inner surface 453 of the spacer 440.

In general, a spacer may be manufactured through a process of forming an opening area and a process of machining the inner surface of the opening area.

In contrast, referring to the embodiment illustrated in FIGS. 11A and 11B, the opening area 448 and C-Cut of the inner surface (e.g., the first inner surface 453a and the second inner surface 453b of FIGS. 10A and 10B) may be simultaneously formed by performing punching on the plate 405 (e.g., a PET film and/or a PI film). Accordingly, the manufacturing process of the spacer 440 may be simplified, and thus mass productivity and reliability may be improved.

Figure 12:
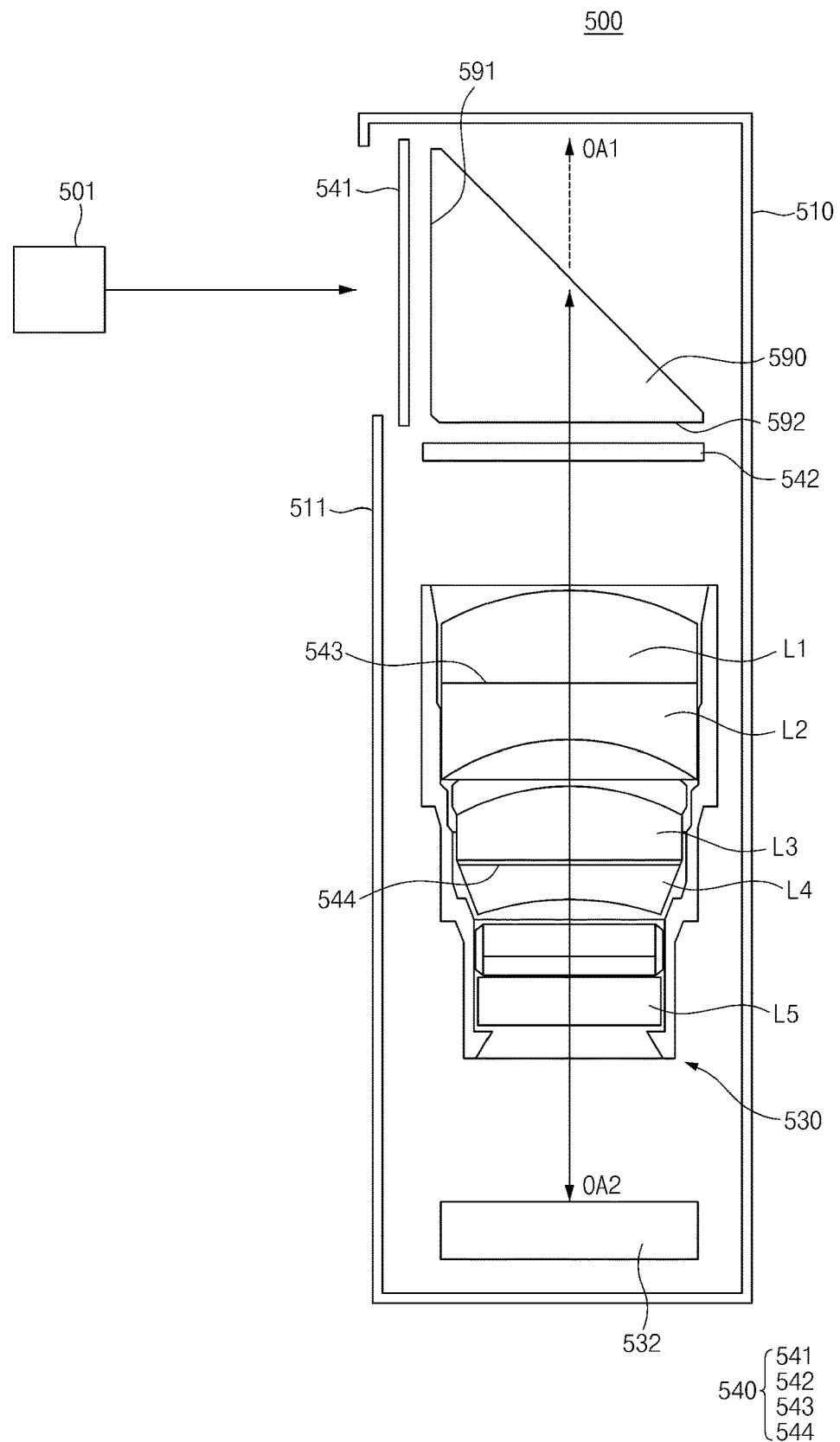
FIG. 12 is a diagram illustrating a camera module and spacers, according to another embodiment.

FIG. 12 is a diagram illustrating a camera module and spacers, according to another embodiment.

Referring to FIG. 12, a camera module 500 includes a camera housing 510, a reflective member 590 disposed in the camera housing 510, a lens assembly 530, and an image sensor 532.

The camera housing 510 may have, in a first surface 511 thereof, a light receiving area 512 through which light reflected or emitted from an object 501 is incident. The light receiving area 512 may be at least partially aligned with the reflective member 590.

The lens assembly 530 may include a plurality of lenses L1, L2, L3, L4, and L5 and the spacers 540. The plurality of lenses L1, L2, L3, L4, and L5 may define an optical axis. At least some of the spacers 540 may be disposed between the lenses.

The reflective member 590 may be disposed in a first optical axis direction 1 (e.g., a direction toward the object 501) with respect to the plurality of lenses L1, L2, L3, L4, and L5. The reflective member 590 may be configured to reflect and/or refract the light incident through the light receiving area 512 toward the lens assembly 530. The reflective member 590 may include a first surface 591 aligned with the light receiving area 512 and a second surface 592 aligned with the optical axis OA. For example, the second surface 592 may be located in the first optical axis direction 1 with respect to the lens assembly 530. The image sensor 532 may be disposed in a second optical axis direction 2 with respect to the plurality of lenses L1, L2, L3, L4, and L5.

The plurality of spacers 540 may include a first spacer 541 disposed adjacent to the first surface 591 of the reflective member 590 and the light receiving area 512, a second spacer 542 disposed adjacent to the second surface 592 of the reflective member 590, a third spacer 543 disposed between the first lens L1 and the second lens L2, and a fourth spacer 544 disposed between the third lens L3 and the fourth lens L4.

The first spacer 541 and the second spacer 542 may be disposed between the reflective member 590 and internal structures of the camera housing 510 and may be configured to buffer an impact applied to the reflective member 590. In various embodiments, the first spacer 541 and/or the second spacer 542 may partially perform an aperture function.

Figure 13A:
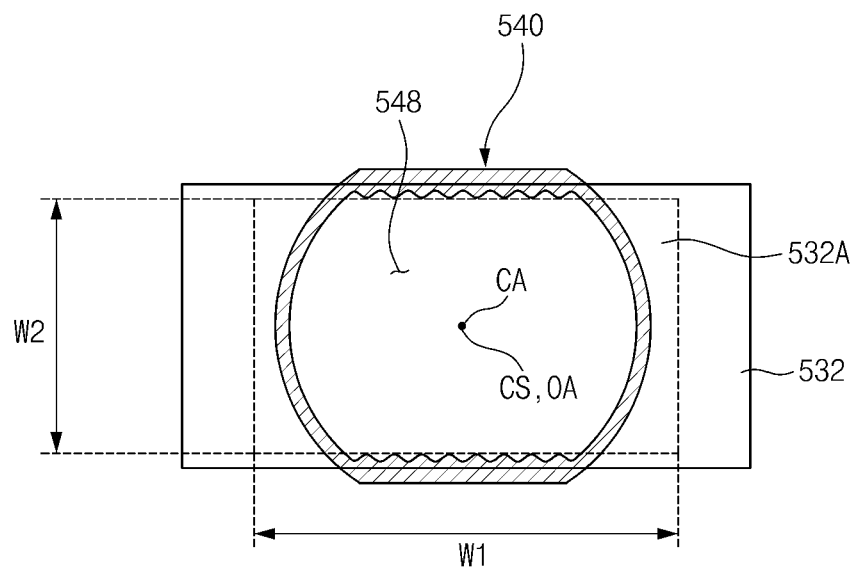
FIG. 13A is a diagram illustrating a spacer and an image sensor of the camera module, according to the other embodiment.
Figure 13B:
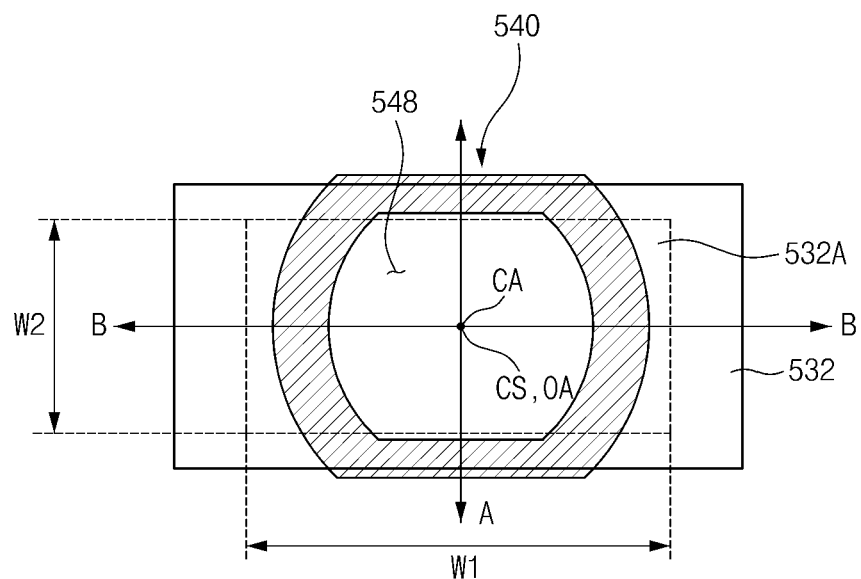
FIG. 13B is a diagram illustrating the spacer and the image sensor of the camera module, according to the other embodiment.
Figure 14A:
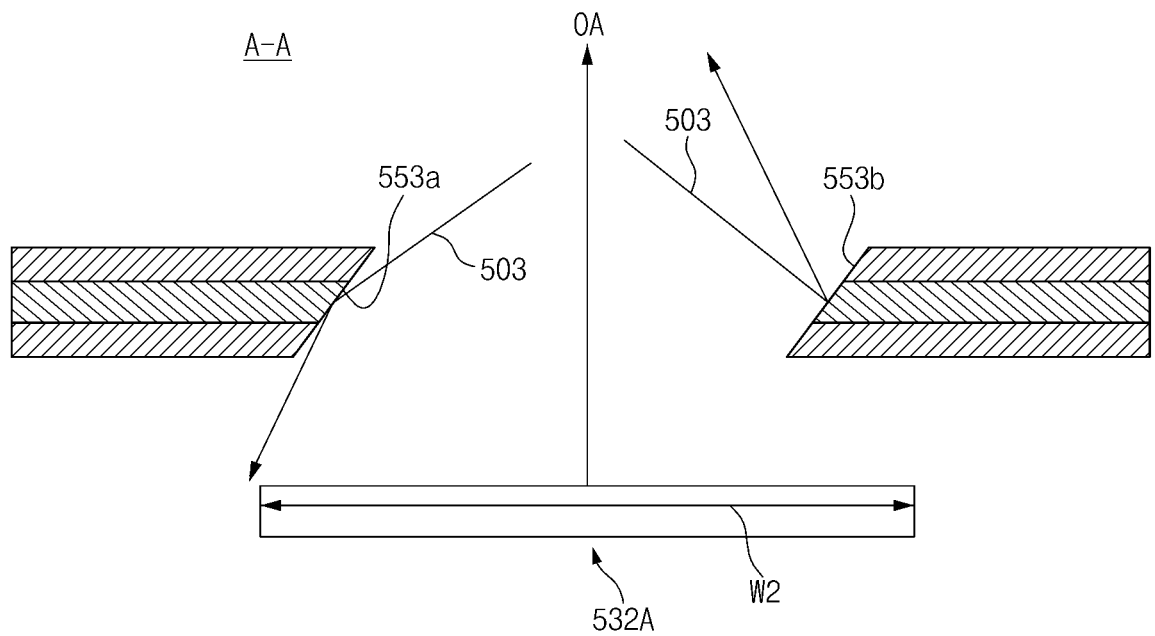
FIG. 14A is a diagram illustrating a sectional view of the spacer and the image sensor of the camera module, according to the other embodiment.
Figure 14B:
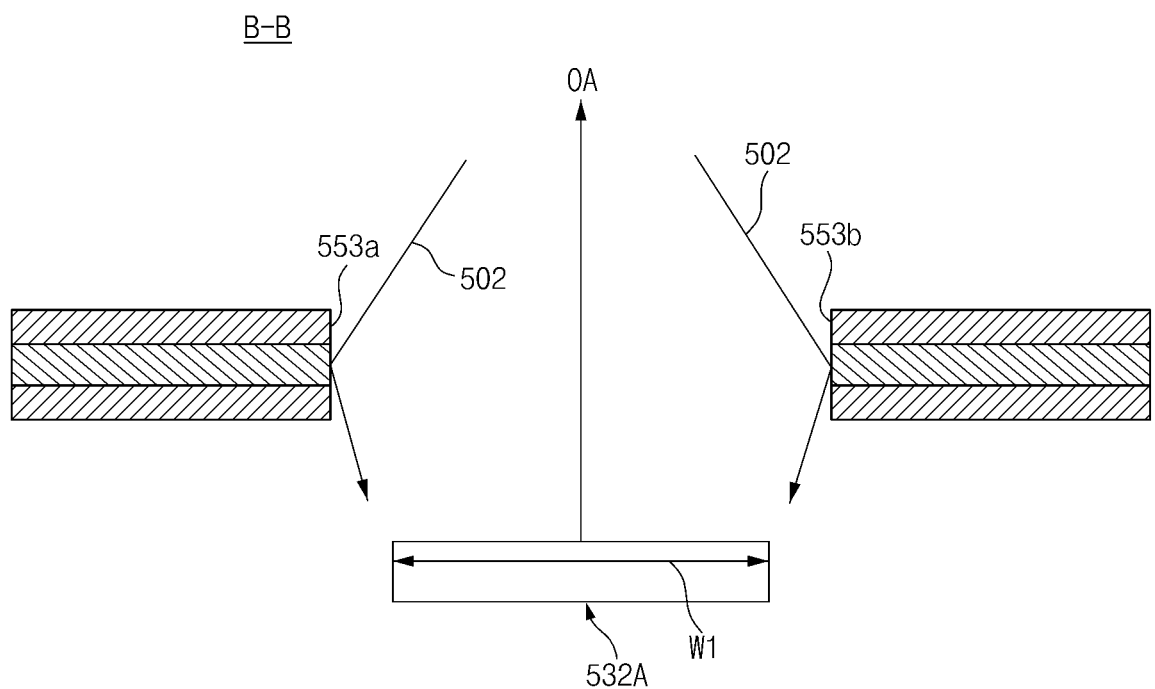
FIG. 14B is a diagram illustrating a sectional view of the spacer and the image sensor of the camera module, according to the other embodiment.

FIG. 13A is a diagram illustrating the spacer and the image sensor of the camera module, according to the other embodiment. FIG. 13B is a diagram illustrating the spacer and the image sensor of the camera module, according to the other embodiment. FIG. 14A is a diagram illustrating a sectional view of the spacer and the image sensor of the camera module, according to the other embodiment. FIG. 14B is a diagram illustrating a sectional view of the spacer and the image sensor of the camera module, according to the other embodiment.

Referring to FIGS. 13A and 13B, the image sensor 532 and/or an active area 532A of the image sensor 532 may be formed in a substantially rectangular shape. For example, a long-side direction (e.g., the horizontal direction based on the drawings) and a short-side direction (e.g., the vertical direction based on the drawings) may be defined in the image sensor 532 and/or the active area 532A of the image sensor 532. For example, the active area 532A of the image sensor 532 may have a first width W1 in the long-side direction and a second width W2 smaller than the first width W1 in the short-side direction.

Referring to FIGS. 13A and 13B, the spacer 540 may be disposed to be at least partially aligned with the image sensor 532. For example, the spacer 540 and the image sensor 532 may be disposed such that the center CA of the active area 532A and the center CS of the spacer 540 coincide with the optical axis OA. For example, the active area 532A of the image sensor 532 may extend outside the spacer 540, or the spacer 540 may extend outside the active area 532A of the image sensor 532.

When viewed in the direction of the optical axis OA, an opening area 548 of the spacer 540 may be defined by a pair of first inner surfaces 551a and 551b facing each other and having a round shape and a pair of second inner surfaces 552a and 552b connecting the pair of first inner surfaces 551a and 551b. For example, referring to FIG. 13B, the second inner surfaces 552a and 552b may be formed in a straight line when viewed in the direction of the optical axis OA. For example, referring to FIG. 13A, patterns 552p may be at least partially formed on the second inner surfaces 552a and 552b.

The spacer 540 may be disposed such that the pair of second inner surfaces 552a and 552b are disposed substantially parallel to the long-side direction of the image sensor 532 and the pair of first inner surfaces 551a and 551b face each other in the short-side direction of the image sensor 532.

Referring to FIGS. 14A and 14B, the spacer 540 may be configured to decrease light reflected from the inner surfaces 551a, 551b, 552a, and 552b of the spacer 540 and received to the active area 532A of the image sensor 532. The reflected light (e.g., first reflected light 502 of FIGS. 14A and 14B) may be more likely to be formed in a straight line (e.g., FIG. 13B) or generated by the pair of second inner surfaces 552a and 552b having the patterns 552p formed thereon (e.g., FIG. 13A). For example, at least a portion of light passing through the opening 548 of the spacer 540 may be reflected by the pair of second inner surfaces 552a and 552b of the spacer 540 and may be incident on the image sensor 532. The reflected light (e.g., the first reflected light 502 of FIGS. 14A and 14B) may degrade image quality.

The spacer 540 may be formed such that the pair of second inner surfaces 552a and 552b have a predetermined angle with respect to the optical axis OA to reduce the reflected light. For example, referring to FIGS. 14A and 14B, the pair of second inner surfaces 552a and 552b may be parallel to each other and may be formed to have a specified angle rather than 0 degrees with respect to the optical axis OA. Accordingly, even when internal reflection by the spacer 540 occurs, the camera module 500 may decrease reflected light received to the image sensor 532, thereby providing improved image quality.

For example, referring to FIG. 14A, the first reflected light 502 may be reflected outward of the edge of the active area 532A, or may be reflected in a direction away from the active area 532A, by the pair of inclined second inner surfaces 552a and 552b.

For example, referring to FIG. 14B, second reflected light 503 may be reflected toward the active area 532A. However, a large portion of the second reflected light 503 may be reflected toward an in-active area (e.g., an area of the image sensor 532 of FIGS. 13A and 13B other than the active area 532A) that is an edge of the image sensor 532, or may be reflected toward the edge of the active area 532A. Accordingly, an influence of the second reflected light 503 on image quality may be relatively limited.

The pair of inclined second inner surfaces 552a and 552b of the spacer 540 may be disposed to face each other in the direction of the small width (e.g., the second width W2) of the active area 532A. Accordingly, even when internal reflection occurs, the camera module 500 may decrease reflected light received to the image sensor 532, thereby providing improved image quality.

An electronic device is provided that includes a camera module that receives external light through a portion of a surface of the electronic device. The camera module includes a camera housing having an image sensor disposed on a bottom surface of the camera housing. The camera module also includes and a lens assembly. At least a portion of the lens assembly is disposed in the camera housing. The lens assembly includes a first lens, a second lens, and a spacer disposed between the first lens and the second lens. The spacer has an opening area formed therein. An optical axis passes through the opening area. The spacer is formed such that a first inner surface of the opening area and a second inner surface of the opening area are parallel to each other in a cross-sectional view that includes the optical axis.

The first inner surface and the second inner surface may include respective first portions, which are parallel to the optical axis.

Inclination angles formed by the first inner surface and the second inner surface with respect to the optical axis may be defined when the spacer 440 is viewed on the section including the optical axis. The spacer may be formed such that the inclination angles continuously increase or decrease along a circumferential direction of a circle having the optical axis as a center with respect to the first portions.

The spacer may include second portions having a largest inclination angle. The second portions may include portions spaced apart from the first portions by substantially 90 degrees in the circumferential direction.

The image sensor may include an active area that receives light passing through the first lens and the second lens. The active area may be formed to have a first width measured in a first direction and a second width measured in a second direction that is perpendicular to the first direction, where the second width is smaller than the first width. The image sensor may be disposed such that the optical axis passes through a center of the active area.

The first inner surface and the second inner surface may include respective first portions, which are parallel to the optical axis. The first portions may be located in the second direction with respect to the optical axis.

Inclination angles formed by the first inner surface and the second inner surface with respect to the optical axis may be defined when the spacer 440 is viewed on the section including the optical axis. The spacer may include second portions having a largest inclination angle, and the second portions may be located in the first direction with respect to the optical axis.

The spacer may include a first surface that at least partially contacts the first lens, and a second surface that at least partially contacts the second lens. A first circular periphery that defines the opening area may be formed on the first surface, and a second circular periphery that defines the opening area may be formed on the second surface. The spacer may be disposed such that a line that connects a first center of the first circular periphery and a second center of the second circular periphery intersects the optical axis.

The spacer may include a notch adjacent to the first portions or formed in a position spaced apart from the first portions 440a by a predetermined angle.

Each of the first lens and the second lens may include an optical portion through which light reflected from an object passes and a peripheral portion around the optical portion. The first surface may at least partially contact the peripheral portion of the first lens, and the second surface may at least partially contact the peripheral portion of the second lens.

The spacer may be disposed such that the opening area is at least partially aligned with the optical portion La of each of the first lens and the second lens in a direction of the optical axis.

The spacer may include a base layer and a coating layer disposed on at least one surface of the base layer. The base layer may include a PET film and/or a PI film, and the coating layer may at least partially contact the first lens L1 or the second lens L2.

The coating layer may be black in color or may contain carbon.

A thickness of the spacer measured in a direction of the optical axis may range from 0.01 mm to 0.2 mm.

The lens assembly may further include a lens barrel that surrounds the first lens, the second lens, and the spacer, and a partial area of the spacer may contact an inner surface of the lens barrel.

A step structure may be formed on the inner surface of the lens barrel, and at least one of the spacer, the first lens, and the second lens may at least partially contact a step surface of the step structure.

An air gap may be formed between the first lens and the second lens.

The lens assembly may further include a plurality of spacers, and at least some of the plurality of spacers may function as an aperture of the camera module.

The lens assembly may further include a plurality of lenses, and at least some of the plurality of spacers may extend between one of the plurality of lenses and an inner surface of a lens barrel.

The spacer may be manufactured by forming the opening area in a base layer using a press mold. The base layer and the press mold may be disposed such that a press direction of the press mold forms a predetermined angle with the base layer. The base layer may contain at least one of PET, PI, and metal.

The opening area may be provided in a form in which a length measured in a first direction and a length measured in a second direction perpendicular to the first direction differ from each other when viewed in a direction of the optical axis.

The spacer may include a curved section and a straight section when viewed in a direction of the optical axis.

A pattern may be formed on at least one of the first inner surface and/or the second inner surface of the opening area.

The camera module may further include a reflective member. At least a portion of the reflective member is disposed in the camera housing. The reflective member may be disposed such that a first surface of the reflective member faces a light receiving area of the camera housing and a second surface of the reflective member faces the first lens and the second lens.

The camera module may further include a second spacer disposed adjacent to at least one of the first surface of the reflective member and the second surface of the reflective member.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to the situation, the expression "adapted to or configured to" used in this disclosure may be used interchangeably with, for example, the expression "suitable for", "having the capacity to", "adapted to", "made to", "capable of", or "designed to" in hardware or software. The expression "a device configured to" may mean that the device is "capable of" operating together with another device or other components. For example, a "processor set to (or configured to) perform A, B, and C" may mean a dedicated processor (e.g., an embedded processor) for performing corresponding operations or a generic-purpose processor (e.g., a CPU or an AP) that performs corresponding operations by executing one or more programs stored in a memory device (e.g., the memory 130).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. The "module" may be implemented mechanically or electronically and may include, for example, an application-specific integrated circuit (ASIC) chip, field-programmable gate arrays (FPGAs), or a programmable-logic device for performing some operations, which are known or will be developed.

At least a part of an apparatus (e.g., modules or functions thereof) or a method (e.g., operations) may be implemented by instructions stored in computer-readable storage media (e.g., the memory 130) in the form of a program module. The instructions, when executed by a processor (e.g., the processor 120), may cause the processor to perform functions corresponding to the instructions. The computer-readable storage media may include a hard disk, a floppy disk, a magnetic media (e.g., a magnetic tape), an optical media (e.g., CD-ROM, DVD, magneto-optical media (e.g., a floptical disk)), an embedded memory, and the like. The instructions may include a code made by a compiler or a code executable by an interpreter.

Each component (e.g., a module or a program) of the above-described components may include a single entity or multiple entities, and some of the multiple entities may be separately disposed in different components. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
    a camera module configured to receive external light through a portion of a surface of the electronic device, wherein the camera module comprises:
        a camera housing having an image sensor disposed on a bottom surface the camera housing; and
        a lens assembly, wherein at least a portion of the lens assembly is disposed in the camera housing, and wherein the lens assembly comprises a first lens, a second lens, and a spacer disposed between the first lens and the second lens,
    wherein the spacer has an opening area formed therein, and an optical axis passes through the opening area,
    wherein the spacer is formed such that a first inner surface of the opening area and a second inner surface of the opening area are inclined and parallel to each other in a cross-sectional view that includes the optical axis,
    wherein the spacer comprises a first surface configured to at least partially contact the first lens, and a second surface configured to at least partially contact the second lens,
    wherein a first circular periphery configured to define the opening area is formed on the first surface and a second circular periphery configured to define the opening area is formed on the second surface, and
    wherein a first center of the first circular periphery is different from a second center of the second circular periphery with respect to the optical axis.

2. The electronic device of claim 1, wherein the first inner surface and the second inner surface include respective first portions, which are parallel to the optical axis.

3. The electronic device of claim 2, wherein:
    inclination angles formed by the first inner surface and the second inner surface with respect to the optical axis are defined in the cross-sectional view including the optical axis; and
    the spacer is formed such that the inclination angles continuously increase or decrease along a circumferential direction of a circle having the optical axis as a center with respect to the first portions.

4. The electronic device of claim 3, wherein:
    the spacer includes second portions having a largest inclination angle; and the second portions include portions spaced apart from the first portions by substantially 90 degrees in the circumferential direction.

5. The electronic device of claim 1, wherein:
the image sensor includes an active area that receives light passing through the first lens and the second lens;
the active area is formed to have a first width measured in a first direction and a second width measured in a second direction that is perpendicular to the first direction, the second width being smaller than the first width; and
the image sensor is disposed such that the optical axis passes through a center of the active area.

6. The electronic device of claim 5, wherein:
the first inner surface and the second inner surface include respective first portions, which are parallel to the optical axis, and
the first portions are located in the second direction with respect to the optical axis.

7. The electronic device of claim 5, wherein:
inclination angles formed by the first inner surface and the second inner surface with respect to the optical axis are defined in a cross-sectional view including the optical axis,
the spacer includes second portions having a largest inclination angle, and
the second portions are located in the first direction with respect to the optical axis.

8. The electronic device of claim 1, wherein
the spacer is disposed such that a line configured to connect the first center of the first circular periphery and the second center of the second circular periphery intersects the optical axis.

9. The electronic device of claim 6, wherein the spacer includes a notch adjacent to the first portions or formed in a position spaced apart from the first portions by a predetermined angle.

10. The electronic device of claim 8, wherein:
each of the first lens and the second lens includes an optical portion through which light reflected from an object passes, and a peripheral portion around the optical portion;
the first surface at least partially contacts the peripheral portion of the first lens; and
the second surface at least partially contacts the peripheral portion of the second lens.

11. The electronic device of claim 10, wherein the spacer is disposed such that the opening area is at least partially aligned with the optical portion of each of the first lens and the second lens in a direction of the optical axis.

12. The electronic device of claim 1, wherein:
the spacer includes a base layer and a coating layer disposed on at least one surface of the base layer;
the base layer includes at least one of a polyethylene terephthalate (PET) film and a polyimide (PI) film, and
the coating layer at least partially contacts the first lens or the second lens.

13. The electronic device of claim 12, wherein the coating layer is black in color or contains carbon.

14. The electronic device of claim 1, wherein a thickness of the spacer measured in a direction of the optical axis ranges from 0.01 mm to 0.2 mm.

15. The electronic device of claim 1, wherein:
the lens assembly further comprises a lens barrel configured to surround the first lens, the second lens, and the spacer; and
a partial area of the spacer contacts an inner surface of the lens barrel.

16. The electronic device of claim 15, wherein:
a step structure is formed on the inner surface of the lens barrel; and
at least one of the spacer, the first lens, or the second lens at least partially contacts a step surface of the step structure.

17. The electronic device of claim 1, wherein an air gap is formed between the first lens and the second lens.

18. The electronic device of claim 1, wherein:
the lens assembly further comprises a plurality of spacers; and
at least some of the plurality of spacers function as an aperture of the camera module.

19. The electronic device of claim 18, wherein:
the lens assembly further comprises a plurality of lenses; and
at least some of the plurality of spacers extend between one of the plurality of lenses and an inner surface of a lens barrel.

20. The electronic device of claim 1, wherein the opening area is formed in a shape in which a length measured in a first direction and a length measured in a second direction perpendicular to the first direction differ from each other when viewed in a direction of the optical axis.

* * * * *